United States Patent
Euler et al.

(10) Patent No.: US 11,091,311 B2
(45) Date of Patent: Aug. 17, 2021

(54) INSULATED CONTAINER AND METHOD OF MAKING THE SAME

(71) Applicant: Berry Global, Inc., Evansville, IN (US)

(72) Inventors: John B. Euler, Evansville, IN (US); Anvit Gupta, Evansville, IN (US); Gerald S. Sutton, Boonville, IN (US); Chris Bolek, Evansville, IN (US)

(73) Assignee: Berry Global, Inc., Evansville, IN (US)

( * ) Notice: Subject to any disclaimer, the term of this patent is extended or adjusted under 35 U.S.C. 154(b) by 0 days.

(21) Appl. No.: 16/058,131

(22) Filed: Aug. 8, 2018

(65) Prior Publication Data

US 2019/0045954 A1 Feb. 14, 2019

Related U.S. Application Data

(60) Provisional application No. 62/542,324, filed on Aug. 8, 2017.

(51) Int. Cl.
*B32B 1/02* (2006.01)
*B65D 81/38* (2006.01)
*B65D 1/28* (2006.01)
*B65D 1/26* (2006.01)
*A47G 19/22* (2006.01)
*B32B 27/06* (2006.01)
(Continued)

(52) U.S. Cl.
CPC ..... *B65D 81/3874* (2013.01); *A47G 19/2288* (2013.01); *B32B 1/02* (2013.01); *B32B 27/065* (2013.01); *B32B 27/20* (2013.01); *B32B 27/32* (2013.01); *B32B 37/153* (2013.01); *B65D 1/265* (2013.01); *B65D 1/28* (2013.01); *B65D 81/3865* (2013.01); *B65D 81/3867* (2013.01); *B32B 2266/025* (2013.01); *B32B 2307/304* (2013.01); *B32B 2307/50* (2013.01); *B32B 2307/5825* (2013.01); *B32B 2307/72* (2013.01); *B32B 2439/00* (2013.01); *B32B 2439/02* (2013.01)

(58) Field of Classification Search
CPC .. B32B 1/02; B65D 1/265; B65D 1/28; B65D 81/3865; B65D 81/3867; B65D 81/3874
See application file for complete search history.

(56) References Cited

U.S. PATENT DOCUMENTS 1,396,282 A 11/1921 Penn
1,435,120 A 11/1922 Holman
(Continued)

FOREIGN PATENT DOCUMENTS

AU 2013334155 B2 2/2017
BE 898053 4/1984
(Continued)

OTHER PUBLICATIONS

Mexican Office Action for Mexican App. No. MX/a/2014/002373 dated Mar. 6, 2020, 10 pages.
(Continued)

*Primary Examiner* — Walter Aughenbaugh
(74) *Attorney, Agent, or Firm* — Barnes & Thornburg LLP

(57) ABSTRACT

An insulative cup is formed of a multi-layer sheet. The multi-layer sheet comprises an insulative cellular non-aromatic polymeric material, a film layer, and a polymeric lamination layer. The insulative cellular non-aromatic polymeric material is formed from a formulation comprising a base resin blend and a physical nucleating agent.

14 Claims, 7 Drawing Sheets

(51) Int. Cl.
B32B 27/20 (2006.01)
B32B 27/32 (2006.01)
B32B 37/15 (2006.01)

(56) References Cited

U.S. PATENT DOCUMENTS

| | | | |
|---|---|---|---|
| 1,920,529 A | 8/1933 | Sidebotham |
| 1,969,030 A | 8/1934 | Page |
| 2,097,899 A | 12/1935 | Smith |
| 2,103,831 A | 12/1937 | Sidon |
| 2,809,776 A | 3/1956 | Barrington |
| 3,182,882 A | 5/1965 | Aellen, Jr. |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Gilbert |
| 3,443,715 A | 5/1969 | Bryant |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | Macdaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,036,675 A | 7/1977 | Amberg |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,669,553 A | 9/1997 | Smith |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,929,127 A | 7/1999 | Raetzsch |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,077,878 A | 6/2000 | Okura |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,193,098 B1 | 2/2001 | Mochizuki |
| 6,218,023 B1 | 4/2001 | DeNicola |
| 6,225,366 B1 | 5/2001 | Raetzsch |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,417,240 B1 | 7/2002 | Park |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |

(56) References Cited

U.S. PATENT DOCUMENTS

| | | |
|---|---|---|
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,875,826 B1 | 4/2005 | Huovinen |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Ho |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,444,905 B2 | 5/2013 | Li |
| 8,679,620 B2 | 3/2014 | Matsushita |
| 8,715,449 B2 | 5/2014 | Leser |
| 8,721,823 B2 | 5/2014 | Vaideeswaran |
| 8,795,827 B2 | 8/2014 | Siche |
| 8,883,280 B2 | 11/2014 | Leser |
| 9,067,705 B2 | 6/2015 | Leser |
| 9,102,461 B2 | 8/2015 | Leser |
| 9,180,995 B2 | 11/2015 | Iyori |
| 9,346,605 B2 * | 5/2016 | Leser .................. B29C 66/4322 |
| 9,358,772 B2 | 6/2016 | Leser |
| 9,688,456 B2 * | 6/2017 | Euler .................. B65D 81/3874 |
| 9,758,292 B2 * | 9/2017 | Leser ..................... B29C 65/02 |
| 9,758,293 B2 | 9/2017 | Leser |
| 9,993,098 B2 | 6/2018 | Leser |
| 10,011,696 B2 | 7/2018 | Leser |
| 10,059,037 B2 * | 8/2018 | Li ......................... B32B 27/065 |
| 2001/0010848 A1 | 8/2001 | Usui |
| 2001/0010849 A1 | 8/2001 | Blizard |
| 2001/0036520 A1 | 11/2001 | Hall |
| 2001/0038893 A1 | 11/2001 | Mohan |
| 2001/0039299 A1 | 11/2001 | Park |
| 2001/0041236 A1 | 11/2001 | Usui |
| 2002/0030296 A1 | 3/2002 | Geddes |
| 2002/0035164 A1 | 3/2002 | Wu |
| 2002/0041046 A1 | 4/2002 | Hartjes |
| 2002/0058126 A1 | 5/2002 | Kannankeril |
| 2002/0135088 A1 | 9/2002 | Hartmann |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | DeBraal |
| 2003/0029876 A1 | 2/2003 | Giraud |

(56) References Cited

U.S. PATENT DOCUMENTS

| | | |
|---|---|---|
| 2003/0069362 A1 | 4/2003 | Ramanathan |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0037980 A1 | 2/2004 | DeBraal |
| 2004/0038018 A1 | 2/2004 | Anderson |
| 2004/0062885 A1 | 4/2004 | Imanari |
| 2004/0115418 A1 | 6/2004 | Anderson |
| 2004/0162358 A1 | 8/2004 | Yamamoto |
| 2004/0162363 A1 | 8/2004 | Mochizuki |
| 2004/0170814 A1 | 9/2004 | VanHandel |
| 2005/0003122 A1 | 1/2005 | Debraal |
| 2005/0006449 A1 | 1/2005 | DAmato |
| 2005/0040218 A1 | 2/2005 | Hinchey |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0073298 A1 | 4/2006 | Hutchinson |
| 2006/0094577 A1 | 5/2006 | Mannlein |
| 2006/0095151 A1 | 5/2006 | Mannlein |
| 2006/0108409 A1 | 5/2006 | Pyper |
| 2006/0135679 A1 | 6/2006 | Winowiecki |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | Lipishan |
| 2008/0020162 A1 | 1/2008 | Fackler |
| 2008/0044617 A1 | 2/2008 | Schmitz |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0187694 A1 | 8/2008 | Alvarez |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0302800 A1 | 12/2008 | Chou |
| 2008/0311812 A1 | 12/2008 | Arriola |
| 2009/0041965 A1 | 2/2009 | Kochem |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0096130 A1 | 4/2009 | Jones |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0108695 A1 | 5/2010 | Zhang |
| 2010/0112247 A1 | 5/2010 | Raesaenen |
| 2010/0116422 A1 | 5/2010 | Vaideeswaran |
| 2010/0137118 A1 | 6/2010 | Chang |
| 2010/0147447 A1 | 6/2010 | Mazzarolo |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0215934 A1 | 8/2010 | Fabian Mariezkurrena |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0285048 A1 | 11/2011 | Barger |
| 2011/0293914 A1 | 12/2011 | Maurer |
| 2011/0318560 A1 | 12/2011 | Yun |
| 2012/0004087 A1 | 1/2012 | Tharayil |

(56) References Cited

U.S. PATENT DOCUMENTS

| | | |
|---|---|---|
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052358 A1 | 2/2013 | Alessandro |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0167311 A1 | 6/2014 | Leser |
| 2014/0262916 A1 | 9/2014 | Minnette |
| 2014/0263367 A1 | 9/2014 | Robertson |
| 2015/0051302 A1 | 2/2015 | Leser |
| 2015/0250342 A1 | 9/2015 | Euler |
| 2015/0258771 A1 | 9/2015 | Leser |
| 2016/0082693 A1 | 3/2016 | Li |
| 2019/0045954 A1 | 2/2019 | Euler |

FOREIGN PATENT DOCUMENTS

| | | |
|---|---|---|
| CA | 2078123 | 9/1991 |
| CA | 2291607 | 6/2000 |
| CA | 2291607 A1 | 6/2000 |
| CA | 2765489 | 12/2010 |
| CN | 1118239 A | 3/1996 |
| CN | 1288427 | 3/2001 |
| CN | 1495100 | 5/2004 |
| CN | 1523051 | 8/2004 |
| CN | 1942370 | 4/2007 |
| CN | 101044195 | 9/2007 |
| CN | 101104716 | 1/2008 |
| CN | 101352923 | 1/2009 |
| CN | 101370873 | 2/2009 |
| CN | 101429309 | 5/2009 |
| CN | 101531260 | 9/2009 |
| CN | 101538387 | 9/2009 |
| CN | 101560307 | 10/2009 |
| CN | 201347706 Y | 11/2009 |
| CN | 102030960 | 4/2011 |
| CN | 102089370 | 6/2011 |
| CN | 102115561 | 7/2011 |
| CN | 102115561 A | 7/2011 |
| CN | 102245368 | 11/2011 |
| CN | 102391570 | 3/2012 |
| CN | 102762350 | 10/2012 |
| DE | 2831240 | 1/1980 |
| DE | 2831240 C | 3/1988 |
| DE | 102006025612 A1 | 11/2007 |
| DE | 102008031812 | 12/2009 |
| EP | 0001791 | 5/1979 |
| EP | 0086869 | 8/1983 |
| EP | 0086869 A1 | 8/1983 |
| EP | 0161597 | 11/1985 |
| EP | 0318167 | 5/1989 |
| EP | 0318167 A2 | 5/1989 |
| EP | 0520028 | 12/1992 |
| EP | 0570221 | 11/1993 |
| EP | 0588321 | 3/1994 |
| EP | 0659647 | 6/1995 |
| EP | 0879844 | 11/1998 |
| EP | 879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1666530 | 6/2006 |
| EP | 1704047 | 9/2006 |
| EP | 1754744 | 2/2007 |
| EP | 1921023 A1 | 5/2008 |
| EP | 1939099 | 7/2008 |
| EP | 1939099 A1 | 7/2008 |
| EP | 2266894 | 12/2010 |
| EP | 2386584 A1 | 11/2011 |
| EP | 2386601 | 11/2011 |
| EP | 2720954 | 4/2014 |
| EP | 2912142 A4 | 3/2016 |
| GB | 1078326 | 8/1967 |
| GB | 2322100 | 8/1998 |
| GB | 2485077 | 5/2012 |
| GB | 2485077 A | 5/2012 |
| GB | 2504166 A | 1/2014 |
| GB | 2506796 | 4/2014 |
| GB | 2506796 A | 4/2014 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | H0543967 | 6/1993 |
| JP | 0615751 | 1/1994 |
| JP | 3140847 | 1/1994 |
| JP | 06192460 | 7/1994 |
| JP | H06322167 A | 11/1994 |
| JP | H08067758 | 3/1996 |
| JP | 2000128255 | 5/2000 |
| JP | P310847 | 12/2000 |
| JP | 2001310429 | 11/2001 |
| JP | 2001315277 | 11/2001 |
| JP | 2001329099 A | 11/2001 |
| JP | 2001348454 A | 12/2001 |
| JP | 2003292663 | 10/2003 |
| JP | 2003321566 | 11/2003 |
| JP | 200418101 | 1/2004 |
| JP | 2004018101 | 1/2004 |
| JP | 2004067820 A | 3/2004 |
| JP | 2004168421 A | 6/2004 |
| JP | 2004330464 | 11/2004 |
| JP | 2005138508 A | 6/2005 |
| JP | 2005272542 | 10/2005 |
| JP | 2006096390 | 4/2006 |
| JP | 2006130814 A | 5/2006 |
| JP | 2006142008 A | 6/2006 |
| JP | 200791323 | 4/2007 |
| JP | 2007154172 | 6/2007 |
| JP | 2008162700 | 7/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| JP | 2011132420 A | 7/2011 |
| JP | 2011207958 A | 10/2011 |
| JP | 2011212968 A | 10/2011 |
| KR | 100306320 | 10/2001 |

(56) References Cited

FOREIGN PATENT DOCUMENTS

| | | |
|---|---|---|
| KR | 2003036558 | 5/2003 |
| KR | 2004017234 | 2/2004 |
| KR | 101196666 | 11/2012 |
| MX | 2004008491 A | 7/2005 |
| MX | 347519 | 4/2014 |
| RU | 2232781 C2 | 7/2004 |
| RU | 2254347 C2 | 6/2005 |
| TW | 393427 | 6/2000 |
| TW | 200404848 | 4/2004 |
| TW | M362648 | 8/2009 |
| TW | 201021747 | 6/2010 |
| TW | 201021747 A | 6/2010 |
| TW | 201309757 | 3/2013 |
| WO | 9113933 | 9/1991 |
| WO | 1991013933 | 9/1991 |
| WO | 9413460 | 6/1994 |
| WO | 1994013460 | 6/1994 |
| WO | 1994013460 A1 | 6/1994 |
| WO | 9729150 | 8/1997 |
| WO | 1998016575 | 4/1998 |
| WO | 0002800 | 1/2000 |
| WO | 0119733 | 3/2001 |
| WO | 0132758 | 5/2001 |
| WO | 0140374 A2 | 6/2001 |
| WO | 0153079 | 7/2001 |
| WO | 0234824 | 5/2002 |
| WO | 03076497 | 9/2003 |
| WO | 03099913 | 12/2003 |
| WO | 2004104075 | 12/2004 |
| WO | 2005097878 | 10/2005 |
| WO | 2006042908 | 4/2006 |
| WO | 2006124369 | 11/2006 |
| WO | 2007003523 | 1/2007 |
| WO | 2007003523 A1 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 | 3/2011 |
| WO | 2011036272 A2 | 3/2011 |
| WO | 2011038081 | 3/2011 |
| WO | 2011038081 A1 | 3/2011 |
| WO | 2011076637 | 6/2011 |
| WO | 2011141044 | 11/2011 |
| WO | 2011144705 | 11/2011 |
| WO | 2012020106 | 2/2012 |
| WO | 2012020106 A1 | 2/2012 |
| WO | 2012025584 | 3/2012 |
| WO | 2012025584 A1 | 3/2012 |
| WO | 2012044730 | 4/2012 |
| WO | 2012055797 | 5/2012 |
| WO | 2012099682 | 7/2012 |
| WO | 2012173873 | 12/2012 |
| WO | 2012174422 | 12/2012 |
| WO | 2012174567 A2 | 12/2012 |
| WO | 2012174568 | 12/2012 |
| WO | 2013032552 | 3/2013 |
| WO | 2013101301 | 7/2013 |
| WO | 2014066761 | 5/2014 |

OTHER PUBLICATIONS

Office Action dated Jan. 14, 2019 for U.S. Appl. No. 15/004,263, (pp. 1-15).
Canadian Examiner's Report and Examination Search Report for Canadian App. No. 2,889,280, dated Apr. 14, 2020, 5 pages.
Mexican Office Action for Mexican App. No. MX/a/2014/002373 dated Jul. 1, 2019, 7 pages.
ISO, "Plastics—Determination of drawing characteristics of thermoplastics in the molten state", ISO, First edition, Jun. 15, 2005, 22 pages.
Indian First Examination Report for Indian Application No. 8947/DELNP/2015 dated Jul. 18, 2019, 7 pages.
Office Action dated Jul. 26, 2019 for U.S. Appl. No. 16/149,351, (pp. 1-6).
Canadian Examiner's Report for Canadian App. No. 2845225 dated Mar. 1, 2019, 3 pages.
First Examination Report for Indian Patent App. No. 110/DELNP/2014 dated Dec. 26, 2019, 8 pages.
Rogers, "All you Need to Know About Polypropylene, Part 1," Creative Mechanisms Blog. (Year: 2014), 6 pages.
Office Action dated Apr. 2, 2019 for U.S. Appl. No. 15/388,319, (pp. 1-17).
Office Action dated Apr. 5, 2019 for U.S. Appl. No. 15/651,284, pp. 1-5.
First Examination Report for Indian Patent App. No. 111/DELNP/2014 dated Apr. 22, 2019, 7 pages.
Office Action dated Apr. 30, 2019 for U.S. Appl. No. 15/004,263 (pp. 1-10).
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
Substantive Examination Report for European App. No. 17182869.2 dated Nov. 12, 2018, 5 pages.
Canadian office action for Canadian App. No. 2842325 dated Oct. 26, 2018, 4 pages.
Officece Action dated Aug. 18, 2015 for U.S. Appl. No. 14/106,212.
Office Action dated Aug. 27, 2015 for U.S. Appl. No. 14/106,358.
Third Party Observations filed with respect to European Patent Application No. 12727994.1, dated Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
Certified English translation of JP2003292663.
Second Chinese Office Action dated Sep. 6, 2015 for Chinese Application Serial No. 201280034350.9.
Office Action dated Oct. 8, 2015 for U.S. Appl. No. 14/188,504.
Office Action dated Oct. 27, 2015 for U.S. Appl. No. 14/462,073.
English translation of Russian Office Action for Application Serial No. 2015127677, dated Sep. 16, 2015.
Inter Partes Review Petition for U.S. Pat. No. 8,883,280 (712 pages) [Submitted in multiple parts].
Gibson and Ashby, Cellular solids: structure and properties, 2nd ed., Cambridge University Press (1997) (7 pages).
C. Maier and T. Calafut, Polypropylene: the Definitive User's Guide and Databook, Plastics Design Library, William Andrew Inc. (1998) (19 pages).
Grant & Hackh's Chemical Dictionary, 5th ed., McGraw-Hill, Inc. (1987) (3 pages).
Merriam-Webster's Collegiate Dictionary, 11th ed. (2003), p. 70 (3 pages).
Merriam-Webster's Collegiate Dictionary, 11th ed. (2003), p. 1237 (3 pages).
Hawley's Condensed Chemical Dictionary, 14th Ed. (2001) (5 pages).
Reichelt et al., Abstract of PP-Blends with Tailored Foamability and Mechanical Properties, Cellular Polymers, (2003) available from

(56) References Cited

OTHER PUBLICATIONS http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly™ HMS Polypropylene for Foam Extrusion" obtained from Borealis webpage obtained from the Internet Archive's "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf)("Brochure '08") (20 pages).
Office Action dated Dec. 31, 2015 for U.S. Appl. No. 14/755,546.
Office Action dated Jan. 11, 2016 for U.S. Appl. No. 14/161,328.
Singapore Notice of Eligibility for Grant, Search Report, and Examination Report transmitted Dec. 10, 2015 for Singapore Application No. 11201503336V.
English translation of First Office Action for Taiwanese Application No. 101121656, dated Nov. 13, 2015.
English summary of Spanish Office Action for Application Serial No. P201490025, dated Feb. 9, 2016, 8 pages.
Extended European Search Report for European Application No. 13849152.7-1303/2912142 PCT/US2013/066811, dated Feb. 12, 2016.
Office Action dated Feb. 16, 2016 for U.S. Appl. No. 14/108,142.
United Kingdom Examination Report for Patent Application No. GB1400762.9 dated Feb. 11, 2016.
English Summary of Russian Office Action for Application Serial No. 2014111340, dated Feb. 25, 2016, 8 pages.
Supplemental European Search Report for European Application No. 12727994.1-1302, dated Feb. 17, 2016.
Australian First Patent Examination Report for Application No. 2012271047, dated Feb. 29, 2016.
Extended European Search Report for European Application No. 13827981.5-1708/2888092 PCT/US2013/053935, dated Feb. 19, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
English Summary of Chinese Office Action for Application Serial No. 201380041896.1, dated Mar. 18, 2016, 7 pages.
International Preliminary Report on Patentability dated Feb. 16, 2016, relating to International Application No. PCT/US2014/051508.
Australian Second Patent Examination Report for Application No. 2012302251, dated Feb. 26, 2016.
Japanese Office Action for Japanese Patent Application No. 2014-528384, dated Mar. 1, 2016.
English summary of Mexican Office Action for Application Serial No. MX/a/2013/014993, dated Apr. 27, 2016, 5 pages.
English summary of Chinese Office Action for Chinese Application Serial No. 201380065781.6, dated Apr. 19, 2016, 14 pages.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, dated Apr. 29, 2016, 5 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daploy-hmspp-extruded-foam/).
Reichelt et al., 'PP-Blends with Tailored Foamability and Mechanical Properties', Cellular Polymers, vol. 22, No. 5, 2003, 14 pages.
Ratzsch et al., 'Radical reactions on polypropylene in the solid state', Prog. Polym. Sci. 27 (2002) 1195-1282, 88 pages.
Excerpts from Encyclopedia of Polymer Science and Technology: Plastics, Resins, Rubbers, and Fibers, 'Blowing Agents', vol. 2, John Wiley & Sons, Inc. (1965), 37 pages.
Excerpts from Polymer Foams: Science and Technology, Lee et al., 'Introduction to Polymeric Foams', CRC Press (2007) 51 pages.
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 dated Feb. 28, 2017, 16 pages.
New Zealand First Examination Report for New Zealand Application 708546, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action dated Mar. 10, 2017 for Chinese Patent Application 201480007369.3, 11 pages.
New Zealand Examination Report for New Zealanc Application No. 708463, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 dated Feb. 23, 2017, 6 pages.
Office Action dated Apr. 7, 2017 for U.S. Appl. No. 14/063,252.
Chinese Office Action for Chinese Application No. 201380065127.5 dated Apr. 1, 2017, 14 pages.
Japanese Office Action for Japanese Application No. 2014-515882, dated Apr. 4, 2017, 6 pages.
New Zealand Examination Report for New Zealand Application No. 708552, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Chinese Office Action for Chinese App. No. 201380065089.3, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319; (pp. 1-21).
Chinese Office Action for Chinese Application No. 201280051426.9, 12 pages.
Chinese Office Action for Chinese App. No. 201380041896.1 dated May 22, 2017, 9 pages.
Taiwan Office Action for Taiwan App. No. 101121655, 29 pages.
Australian Examiner's Report for Australian App. No. 2014244210, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).

(56) References Cited

OTHER PUBLICATIONS

Japanese Office Action for Japanese Patent App. No. 2015-539838 dated Jun. 6, 2017, 19 pages.
New Zealand Examination Report for New Zealand Application 708546, 2 pages.
Office Action dated Jul. 19, 2017 for U.S. Appl. No. 15/004,263; (pp. 1-17).
European Examination Report for European App. No. 13849152.7 dated Jun. 29, 2017, 4 pages.
Taiwan Office Action for Taiwan App. No. 102138786, 25 pages.
Office Action dated Aug. 22, 2017 for U.S. Appl. No. 14/188,504; (pp. 1-9).
Australian Examination REport for Australian App. No. 2016204692, 3 pages.
German Office Action for German App. No. 11 2012 002 042.1, 20 pages.
Chinese Office Action dated Sep. 21, 2017 for Chinese Patent Application 201480007369.3, 4 pages.
Taiwan Office Action for Taiwan Pat. App. No. 101121656 dated Aug. 1, 2017, 16 pages.
Office Action dated Oct. 18, 2017 for U.S. Appl. No. 14/063,252; (pp. 1-17).
Chinese Office Action for Chinese Application No. 201380065127.5 dated Sep. 27, 2017, 19 pages.
Office Action dated Oct. 26, 2017 for U.S. Appl. No. 15/139,573; (pp. 1-8).
Office Action dated Nov. 2, 2017 for U.S. Appl. No. 15/650,424; (pp. 1-6).
Extended European Search Report for European App. No. 17182869.2 dated Oct. 19, 2017, 5 pages.
Extended European Search Report for European App. No. 171812316 dated Nov. 7, 2017, 5 pages.
Office Action dated Nov. 14, 2017 for U.S. Appl. No. 14/862,552; (pp. 1-14).
"All You Need to Know About Polypropylene, Part 1," Creative Mechanisms Blog. (Year: 2016).
Rejection Decions for Chinese Patent App. No. 201280051426.9, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
ASTM D4101-11, an American Society for Testing and Materials "Standard Standard Specification for Polypropylene Injection and Extrusion Materials," 2011, 17 pages.
Chinese Office Action for Chinese App. No. 201380065781.6 dated Nov. 28, 2017, 10 pages.
European Examination Report for European App. No. 13849152.7 dated Jan. 4, 2018, 3 pages.
Office Action dated Jan. 16, 2018 for U.S. Appl. No. 15/388,319; (pp. 1-13).
Office Action dated Jan. 19, 2018 for U.S. Appl. No. 15/004,263; (pp. 1-18)
Extended European Search Report for European App. No. 14836418.5 dated Jan. 30, 2018, 4 pages.
Canadian office action for Canadian App. No. 2,842,325 dated Jan. 24, 2018, 4 pages.
Japanese Office Action for Japanese App. No. 2016-501945 dated Jan. 23, 2018.
Canadian Examiner's Report for Canadian App. No. 2845225 dated Feb. 6, 2018, 5 pages.
Taiwan Office Action for Taiwan App. No. 103128338, 9 pages.
Japanese Office Action for Japanese Patent App. No. 2015-539838 dated Feb. 27, 2018, 10 pages.
Taiwan Office Action for Taiwan App. No. 102138786, 20 pages.
Chinese Office Action dated Mar. 22, 2018 for Chinese Patent Application 201480007369.3, 5 pages.
Office Action dated Mar. 29, 2018 for U.S. Appl. No. 14/862,552, (pp. 1-10).
Chinese Office Action for Chinese Application No. 201380065127.5, dated Jul. 26, 2016, 11 pages.
Taiwan Office Action for Taiwan App. No. 101121655, 6 pages, (no English translation available).
"All you need to know about Polypropylene, Part 1," Creative Mechanisms. (Year: 2017), 6 pages.
"Polypropylene, Impact Copolymer," Lyondell Basell. (Year: 2017).
Australian Notice of Acceptance for Australian App. No. 2016204692, 3 pages.
First Substantive Examiantion Report for European App. No. 14775300.8 dated Apr. 6, 2018, 4 pages.
Office Action dated Jun. 6, 2018 for U.S. Appl. No. 15/388,319 (pp. 1-19).
Notice of Opposition for EP2751194 submitted May 28, 2018, 11 pages.
Grounds of Opposition for EP2751194 submitted May 28, 2018, 40 pages.
Pasquini, Nello, "Polypropylene Handbook," Carl Hanser Verlag, 2005, 7 pages.
Himont, Pro-fay PF814 brochure, 1992, 1 page.
Maier et al., "Polypropylene: The Definitive User's Guide and Databook" Plastics Design Library, 1998, 19 pages.
Gachter et al., "Taschenbuch der Kunststoff-Additive" Carl Hanser Verlag, 1983, 17 pages, (no English translation available).
Wypych, "Handbook of Antiblocking, Release, and Slip Additives" ChemTec Publishing, 2011, 10 pages.
Zweifel, Hans, "Plastics Additives Handbook" Carl Hanser Verlag, 2001, 6 pages.
Wiesner et al. "The Right Chemical Foaming Agent for Your Application" The Sixth International Conference "Blowing Agents and Foaming Processes 2004", 11 pages.
Hydrocerol—Chemical Foaming and Nucleating Agents, 2007, 8 pages.
Montell at K98—presentation of extrusion line, 1998, 2 pages.
Montell Polyolefins "PP meets foam in sheet—Pro-fax PF-814 paves the way to PP foam growth", available at least by May 28, 2018, 4 pages.
Glossary of Terms for the chemical Fabrics & Film Industry, available at least by May 28, 2018, 5 pages.
ASTM D 883-08, Standard Terminology Relating to Plastics, 2008, 15 pages.
ASTM D 1922-93, Standard Test Method for Propagation Tear Resistance of Plastic Film and Thin Sheeting by Pendulum Method, 1993, 5 pages.
ASTM D3763-02, Standard Test Method for High Speed Puncture Properties of Plastics Using Load and Displacement SEnsors, 2002, 10 pages.
Tolinski, "Additives for Polyolefins: Getting the Most Out of Polypropylene, Polyethylene, and TPO" Elsevier, 2009, 25 pages.
Borealis, DaployTM HMS Polypropylene for Foam Extrusion, 2007, 20 pages.
Borealis, DaployTM HMS Polypropylene for Foam Extrusion, 2010, 20 pages.
Documents from Inter Parte Review of U.S. Pat. No. 8,883,280, entered Jan. 26, 2016, 26 pages.
Clarian, Technical Product Information "Hydrocerol CF40E", 2004, 1 page.
First Examination Report for Indian App. No. 5756/DELNP/2015 dated Dec. 12, 2019, 5 pages.
Office Action dated Apr. 27, 2020 for U.S. Appl. No. 16/058,126, (pp. 1-12).
Korean Notice of Preliminary Rejection for Korean Pat. App. No. 10-2015-7021888 dated Apr. 21, 2020, 11 pages.
Office Action dated Dec. 6, 2018 for U.S. Appl. No. 15/388,319, (pp. 1-10).

(56) References Cited

OTHER PUBLICATIONS

Office Action dated Dec. 13, 2018 for U.S. Appl. No. 15/672,668, (pp. 1-13).
Clariant, Technical Product Information "Hydrocerol CF20E", 2004, 6 pages.
Clariant, Data sheet Hydrocerol CT516, 2004, 5 pages.
Jan-Erik Wegner, Affidavit regarding Hydrocerol, available at least by May 28, 2018, 22 pages.
Borealis HC600TF, 2008, 3 pages.
Borealis HC205TF, 2007, 3 pages.
Isplen codes, available at least by May 28, 2018, 1 page.
Quimica Chemicals—Isplen Polypropylene Compounds, brochure Apr. 2010, 20 pages.
Rychly, J. et al., "The effect of physical parameters of isotactic polypropylene on its oxidisability measured by chemiluminescence method. Contribution to the spreading phenomenon" Polymer Degradation and Stability, vol. 71, No. 2, 2001, 8 pages.
Tiemblo, P. et al., "The autoacceleration of polypropylene thermo-oxidation in reduced coordinates: effect of the oxidation temperature and of polyolefin structure" Polymer Degradation and Stability, vol. 72, No. 1, 2001, 8 pages.
Bezati, F. et al., "Addition of tracers into the polypropylene in view of automatic sorting of plastic wastes using X-ray fluorescence spectrometry" Waste Management, vol. 30, No. 4, May 2010, 6 pages.
Translation of CN101560307A, 19 pages.
Gotsis, A. D. et al., "The Effect of Long Chain Branching on the Processability of Polypropylene in Thermoforming" Polymer Engineering and Science, vol. 44, No. 5, May 2004, 10 pages.
"Product News" Daploy WB135HMS—High Melt Strength Polyproyplene for Foam Extrusion, 2004, 2 pages.
Naguib, Hani E. et al., "Effects of Blending of Branched and Linear Polypropylene Materials on the Foamability" Technical Papers of the Annual Technical Conference—Society of Plastics Engineers Incorporated, 2001, 8 pages.
Antunes, Marcelo et al., "Heat Transfer in Polypropylene-Based Foams Produced Using Different Foaming Processes" Advanced Engineering Materials, vol. 11, No. 1 0, May 2009, 7 pages.
R0hne Gunhild. Foaming of Soft Polyproyplene Blends. Conference Proceedings: Zlin Czech Republic, Aug. 16-18, 2000, 4 pages.
Mikell Knights, "Theres Plenty of Fizz in Foam Blow Molding" Plastics Technology, available from https:llwww.ptonline.com/articles/there%27s-plenty-of-fizz-in-foam-blow-molding, 1999, 4 pages.
Crodamide brochure Feb. 2000, 4 pages.
Tabatabaei, Seyed H. et al., "Rheological and thermal properties of blends of a long-chain branched polypropylene and different linear polypropylenes" Chemical Engineering Science, vol. 64, No. 22, 2009, 13 pages.
Stange, Jens et al., "Rheological properties and foaming behavior of polypropylenes with different molecular structures" Journal of Rheology, vol. 50, No. 6, 2006, 18 pages.
Clariant, Cesa Slip, Sep. 2000, 6 pages.
Antunes, Marcelo et al., "Study of the cellular structure heterogeneity and anisotropy of polypropylene and polypropylene nanocomposite foams" Polymer Engineering and Science, vol. 49, No. 12, May 2009, 14 pages.
Office Action dated Jun. 22, 2018 for U.S. Appl. No. 15/004,263 (pp. 1-20).
Shutov, Fyodor, "Foamed Polymers. Cellular Structure and Properties", Springer Berlin Heidelberg, Industrial Developments vol. 51, Jun. 2005, p. 176-182, 8 pages.
Taiwan Office Action for Taiwan App. No. 102146298 dated Oct. 26, 2016, 9 pages.
Chinese Rejection Decision for Chinese App. No. 201380065781.6 dated Jul. 12, 2018, 15 pages, (No English Translation available).
Indian Examination Report for Indian App. No. 3919/DELNP/2015, sent Aug. 21, 2018, 5 pages.

Markus Gahleitner et al., "Heterophasic Copolymers of Polypropylene: Development, Design, Principles, and Future Challenges," Journal of Applied Polymer Science, 2013, Wiley Periodicals, 10 pages.
Sadiqali Cheruthazhekatt et al., "Multidimensional Analysis of the Complex Composition of Impact Polypropylene Copolymers: Combination of TREF, SEC-FTIR-HPer DSC, and High Temperature 2D-LC," Macromolecules 2012, 45, 2025-2305, ACS Publications, American Chemcial Society, 10 pages.
English Summary of Chinese Rejection Decision for Chinese App. No. 201380065781.6 dated Jul. 12, 2018, 4 pages.
Indian First Examination Report for Indian Pat. App. No. 2179/DELNP/2014 dated May 24, 2019, 6 pages.
Canadian Examiner's Report for Canadian App. No. 2845225 dated Nov. 18, 2019, 4 pages.
Office Action dated Nov. 29, 2019 for U.S. Appl. No. 15/651,284, (pp. 1-6).
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Daploy HMS Polypropylene for Foam Extrusion, 20 pages, Borealis Boroughe Shaping the Future with Plastics, Published 2010, www.borealisgroup.com, www.borouge.com, Vienna, Austria.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.

(56) References Cited

OTHER PUBLICATIONS

New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP's Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action Chinese Patent Application No. 201280051426.9 dated Jul. 23, 2015.
Office Action dated May 19, 2015 for Chinese Application No. 201280035667.4.
Japanese Office Action for Japanese Patent App. No. 2019-045572 dated Jan. 14, 2020, 6 pages.
Canadian Examiner's Report for Canadian App. No. 2896256, dated Feb. 6, 2020, 4 pages.
ASTM D3763-86, an American Society for Testing of Materials (ASTM), 'Standard Method for High-Speed Puncture Properties of Plastics Using Load and Displacement Sensors' (1986 Edition), 5 pages.
ASTM D1922-93, an American Society for Testing of Materials (ASTM), "Standard Method for Propagation Tear Resistance of Plastic Film and Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., 'Applicability of the Transient Plane Source Method to Measure the Thermal Conductivity of Low-Density Polyethylene Foams', Journal of Polymer Science: Part B: Polymer Physics, vol. 42 (2004), 1226-1234.
The Burn Foundation, 'Scald Burns', available at https://web.archive.org/web/20080926114057/http:/wwwvii.burnfoundation.org/programs/resource.cfm?c=1&a=3, dated Sep. 26, 2008, accessed on Feb. 5, 2016.

AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
Power of a Microwave Oven, available at https://web.archive.org/web/20071010183358/http://hypertextbook.com/facts/2007/TatyanaNektalova.shtml, dated Oct. 10, 2007, accessed on Feb. 5, 2016.
Health Physics Society, 'Microwave Oven Q & A', available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.G. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
Re-examination Notification for Chinese Patent App. No. 201280051426.9, 19 pages.
Office Action dated Mar. 7, 2019 for U.S. Appl. No. 16/023,218 (pp. 1-5).
Examination Report for Indian Patent App. No. 5758/DELNP/2015 dated Aug. 28, 2019, 7 pages.
First Examination Report for Indian App. No. 5804/DELNP/2015, dated Aug. 5, 2019, 7 pages.
Office Action dated Sep. 26, 2018 for U.S. Appl. No. 15/651,284, (pp. 1-10).
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
English translation of Japanese Office Action for Japanese Application No. 2014-516089, dated May 10, 2016.
Office Action dated Mar. 10, 2016 for U.S. Appl. No. 14/462,073.
Office Action dated Jun. 10, 2016 for U.S. Appl. No. 14/188,504.
Singapore Office Action and Written Opinion dated May 27, 2016 for Singapore Application No. 11201504327V.

(56) References Cited

OTHER PUBLICATIONS

Singapore Office Action and Written Opinion dated May 27, 2016 for Singapore Application No. 11201504330U.
Notice of Acceptance dated Jun. 10, 2016 for Australian Application No. 2012302251.
Singapore Office Action and Written Opinion dated May 26, 2016 for Singapore Application No. 11201504333Y.
Office Action for Chinese Patent Application No. 201380064860.5, dated Jun. 2, 2016 including English language summary, 13 pages.
Australian First Patent Examination Report for Application No. 2012363114, dated Jun. 15, 2016, 4 pages.
Office Action dated Jun. 30, 2016 for U.S. Appl. No. 14/106,276.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Australian First Patent Examination Report for Application No. 2013334155, dated May 23, 2016, 4 pages.
Office Action for Chinese Patent Application No. 201380065116.7, dated Jun. 28, 2016, including English language summary, 12 pages.
Office Action dated Jul. 28, 2016 for U.S. Appl. No. 14/211,553.
British Examination Report for GB Application No. GB1400762.9, dated Aug. 8, 2016, 2 pages.
Extended European Search Report for European Application No. 13863546.1 established Jul. 12, 2016, 7 pages.
Extended European Search Report for European Application No. 13863308.6 dated Jul. 19, 2016, 8 pages.
Lyondellbasell Technical Data Sheet for Pro-fax SC204 dated Mar. 17, 2016, 3 pages.
Examination Report for GB1405600.6 dated Oct. 15, 2019, 4 pages.
Second Re-examination Notification for Chinese Patent App. No. 201280051426.9, 21 pages.
Office ACtion dated Oct. 18, 2019 for U.S. Appl. No. 16/546,723, (pp. 1-6).
Office Action dated Aug. 11, 2016 for U.S. Appl. No. 14/108,110.
Chinese Office Action dated Aug. 3, 2016 for Chinese Patent Application 201480007369.3, 13 pages.
M. Antunes et al., 'Heat Transfer in Polyolefin Foams,' Heat Transfer in Multi-Phase Materials, A. Ochsner and G. E. Murch, Eds. Springer-Verlag Berlin Heidelberg, 2011, 131-161.
Office Action dated Sep. 1, 2016 for U.S. Appl. No. 14/106,212.
Australian First Patent Examination Report for Application No. 2013359097 dated Aug. 26, 2016, 3 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dated Aug. 30, 2016, 6 pages.
Mexican Office Action for Mexican Application MX/a/2013/014993, 6 pages.
New Zealand Examination Report for New Zealand Application No. 708552, 4 pages.
New Zealand First Examination Report for New Zealand Application 708546, 4 pages.
Russian Office Action for Russian Application No. 2014101298, 3 pages.
European Examination Report for European App. No. 12727994.1, 4 pages.
Chinese Office Action for Chinese App. No. 201380065089.3, 12 pages.
European Search Report for European App. No. 13849152.7, 3 pages.
Australian Patent Examination Report for Australian App. No. 2013334155 dated Oct. 24, 2016, 7 pages.
Taiwan Office Action for Taiwan Pat. App. No. 102146299, 7 pages.
Third Party Observation filed in European Patent App. No. 12727994.1, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4, 4 pages.
British Examination Report for GB App. No. 1400762.9, 2 pages.
Chinese Office Action for Chinese Applicaiton 201380065781.6, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3, 9 pages.
Office Action dated Nov. 4, 2016 for U.S. Appl. No. 13/961,411.
Chinese Office Action for Chinese Application No. 201280051426.9, 9 pages.
English Summary of Chinese Office Action for Application Serial No. 2013800418961 dated Nov. 11, 2016, 11 pages.
Extended European Search Report for European App. No. 14775300.8 dated Oct. 24, 2016, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025, 5 pages.
Japanese Office Action for Japanese Patent App. 2014-516089 dated Dec. 20, 2016, 6 pages.
Japanese Office Action for Japanese App. No. 2014-528384, 15 pages.
Singapore Office Action and Written Opinion for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 dated Jan. 30, 2017, 3 pages.
Office Action dated Sep. 30, 2020 for U.S. Appl. No. 16/058,126, (pp. 1-11).
Office Action dated Sep. 30, 2020 for U.S. Appl. No. 16/531,530, (pp. 1-10).
Notice to Attend Hearing for Indian Patent App. No. 2179/DELNP/2014 dated Aug. 17, 2020, 2 pages.
Mexican Office Action for Mexican Patent App. No. MX/a/2015005207 dated Jul. 22, 2020, 5 pages.
Notice of Appeal Decision for Japanese App. No. 2016-501945 dated Aug. 18, 2020, 15 pages.
Office Action dated Sep. 3, 2020 for U.S. Appl. No. 16/858,778 (pp. 1-10).
Office Action dated Jun. 12, 2020 for U.S. Appl. No. 15/651,284, (pp. 1-8).
Hearing Notice for Indian Application No. 8947/DELNP/2015 dated Jul. 23, 2020, 3 pages.
German Office Action for German App. No. 11 2012 00 070.2 dated Oct. 20, 2020, 23 pages.
Canadian Examiner's Report and Examination Search Report for Canadian App. No. 2,889,280, dated Oct. 27, 2020, 4 pages.

(56) References Cited

OTHER PUBLICATIONS

Japanese Office Action for Japanese Patent App. No. 2019-045572 dated Oct. 30, 2020, 6 pages.
Third Mexican Office Action for Mexican App. No. MX/a/2014/002373 dated Jan. 8, 2021, 9 pages, only first 2 pages in English (summary).
Office Action dated Jan. 25, 2021 for U.S. Appl. No. 16/058,126, (pp. 1-13).
Canadian Examiner's Second Report for Canadian App. No. 2896256, dated Dec. 2, 2020, 4 pages.
Canadian Examiner's Report for Canadian App. No. 2845225 dated Dec. 2, 2020, 4 pages.
Borealis Product Brochure, "DaployTM HMS Polypropylene for Foam Extrusion", 20 pages, 2010.
First Mexican Office Action for Mexican Patent App. No. MX/a/2015/008525 dated Nov. 5, 2020, 17 pages.
Korean Second Notice of Preliminary Rejection for Korean Pat. App. No. 10-2015-7021888 dated Dec. 29, 2020, 16 pages, only first 8 pages in English (translation).
Combined Search and Examination Report for Great Britain App. No. GB2010642.3 dated Mar. 31, 2021, BP-356 GB-DIV1 ||, 3 pages.
Japanese Office Action for Japanese Patent App. No. 2019-045572 dated Apr. 13, 2021, BP-392 JP ||, 6 pages, only 5 pages in English.
First Mexican Office Action for Mexican Patent App. No. MX/a/2015/008525 dated May 3, 2021, BP-392 MX ||, 11 pages, only 5 pages in English.

* cited by examiner

INSULATED CONTAINER AND METHOD OF MAKING THE SAME

PRIORITY CLAIM

This application claims priority under 35 U.S.C. § 119(e) to U.S. Provisional Application Ser. No. 62/542,324, filed Aug. 8, 2017, which is expressly incorporated by reference herein.

BACKGROUND

The present disclosure relates to polymeric materials that can be formed to produce a container, and in particular, polymeric materials that insulate. More particularly, the present disclosure relates to containers that are formed of a non-aromatic polymeric material.

SUMMARY

A cup in accordance with the present disclosure is formed of a multi-layer sheet including a film layer and an insulative cellular non-aromatic polymeric material. In illustrative embodiments, a blend of polymeric resins and cell-forming agents is extruded or otherwise formed to produce the insulated cellular non-aromatic polymeric material.

In illustrative embodiments, a polymeric-lamination layer couples together the film layer and the insulative cellular non-aromatic polymeric material. The multi-layer sheet may be formed by an extrusion lamination procedure that extrudes the polymer-lamination layer onto the insulative cellular non-aromatic polymeric material.

In some illustrative embodiments, the polymeric-lamination layer comprises a polypropylene, a polyethylene, or a mixture thereof. In some embodiments, the polymeric-lamination layer is substantially free of an adhesive.

In some illustrative embodiments, the insulative cellular non-aromatic polymer material, the polymeric-lamination layer, or both comprise regrind. In some embodiments, regrind is blend of materials recaptured from the steps in forming the multi-layer sheet. In some illustrative embodiments, regrind is substantially free of an adhesive.

In some illustrative embodiments, the cup may have a tear resistance in a machine direction of at least about 75 gf according to ASTM D1922-93. In some illustrative embodiments, the cup has a puncture resistance of at least about 6,000 gf.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 5A is a partial section view taken along line 4-4 of FIG. 1 showing the first region is in the side wall of the body;

FIG. 5B is a partial section view taken along line 4-4 of FIG. 1 showing the second region is in the rolled brim of the body;

FIG. 5C is a partial section view taken along line 4-4 of FIG. 1 showing the third region is in a connecting web included in the floor mount of the body;

FIG. 5D is a partial section view taken along line 5D-5D of FIG. 4 showing the fourth region is in a web-support ring included in the floor mount of the body;

Figure 1:
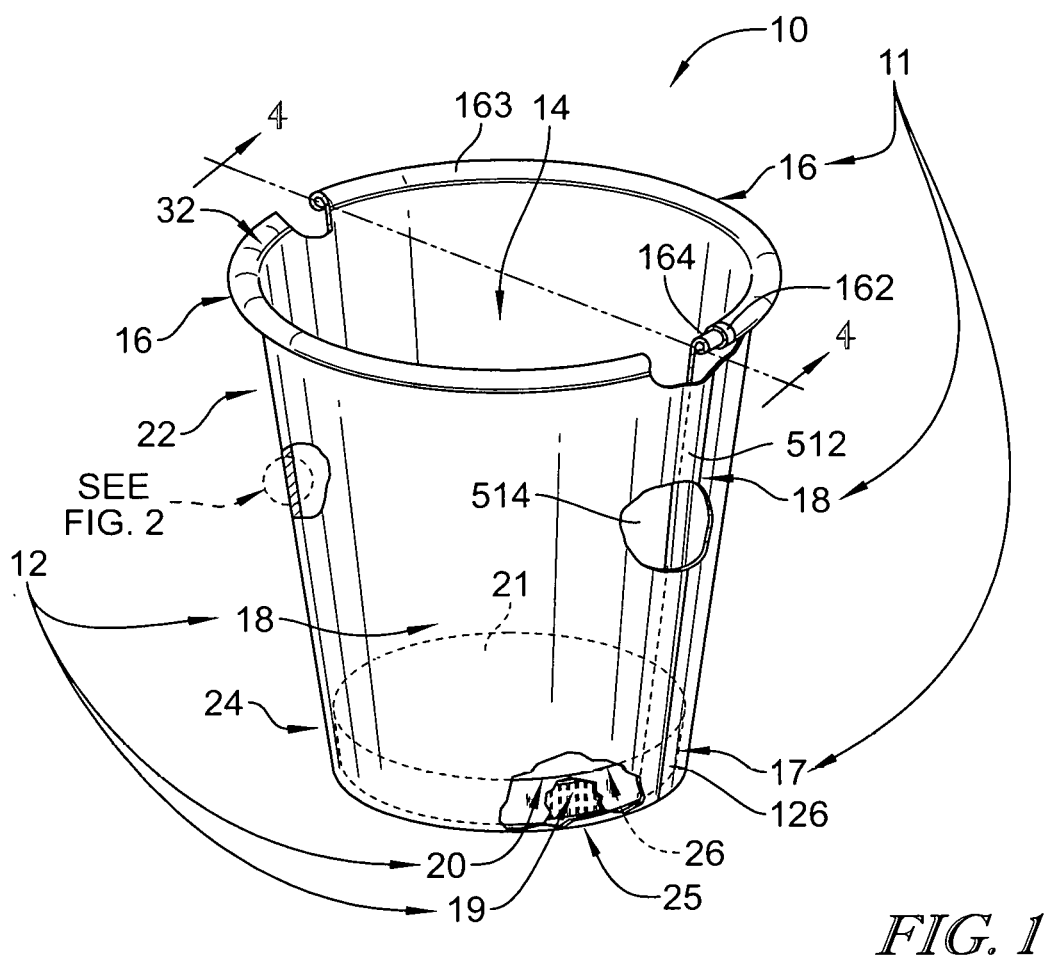
FIG. 1 is a perspective view of an insulative cup in accordance with the present disclosure showing that the insulative cup includes a body and a floor.
Figure 6:
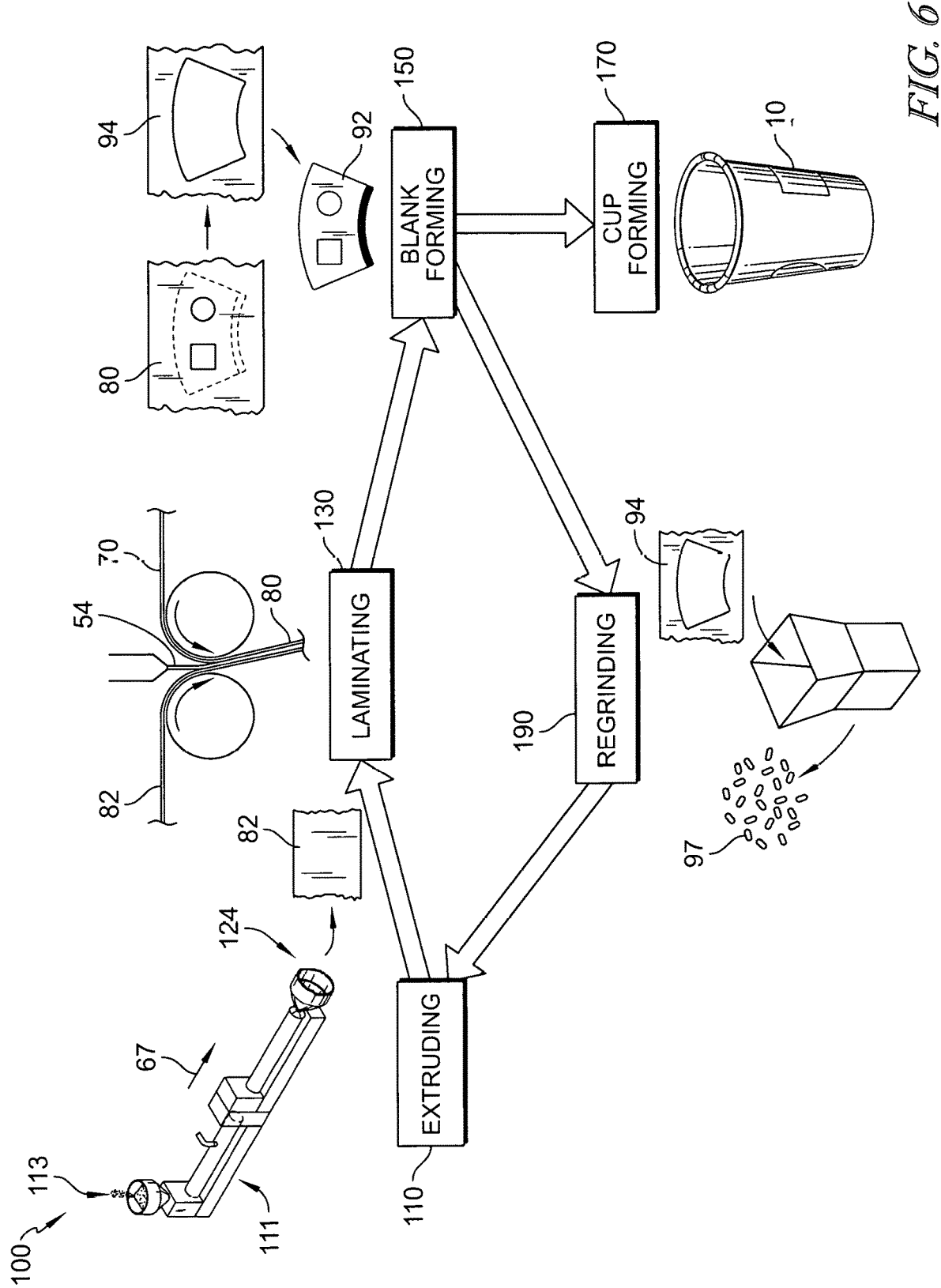
Figure 7A:
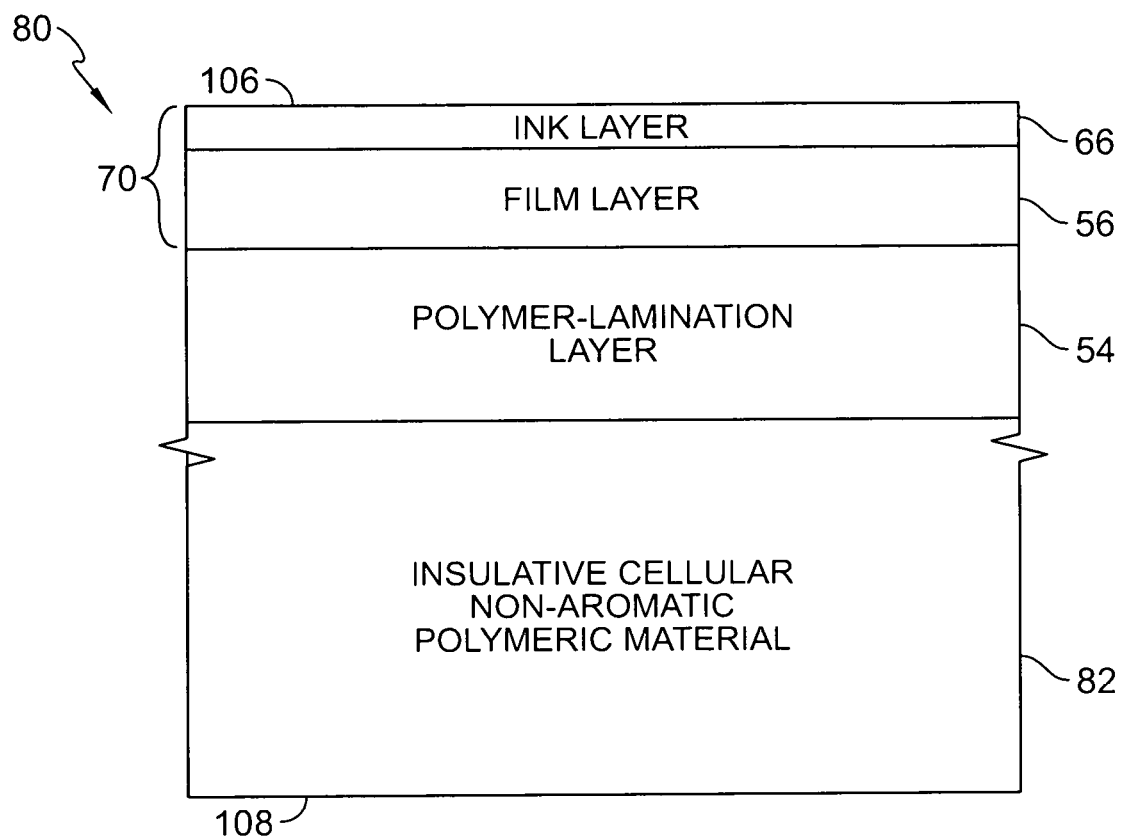
Figure 7B:
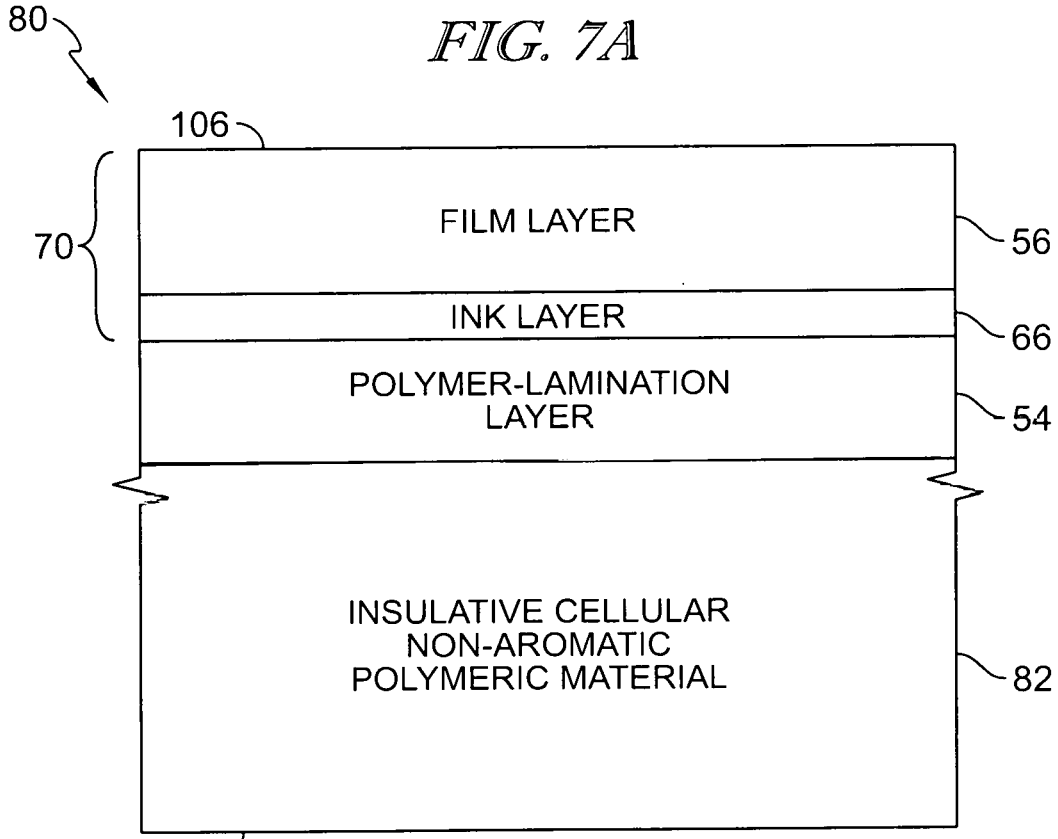
Figure 8:
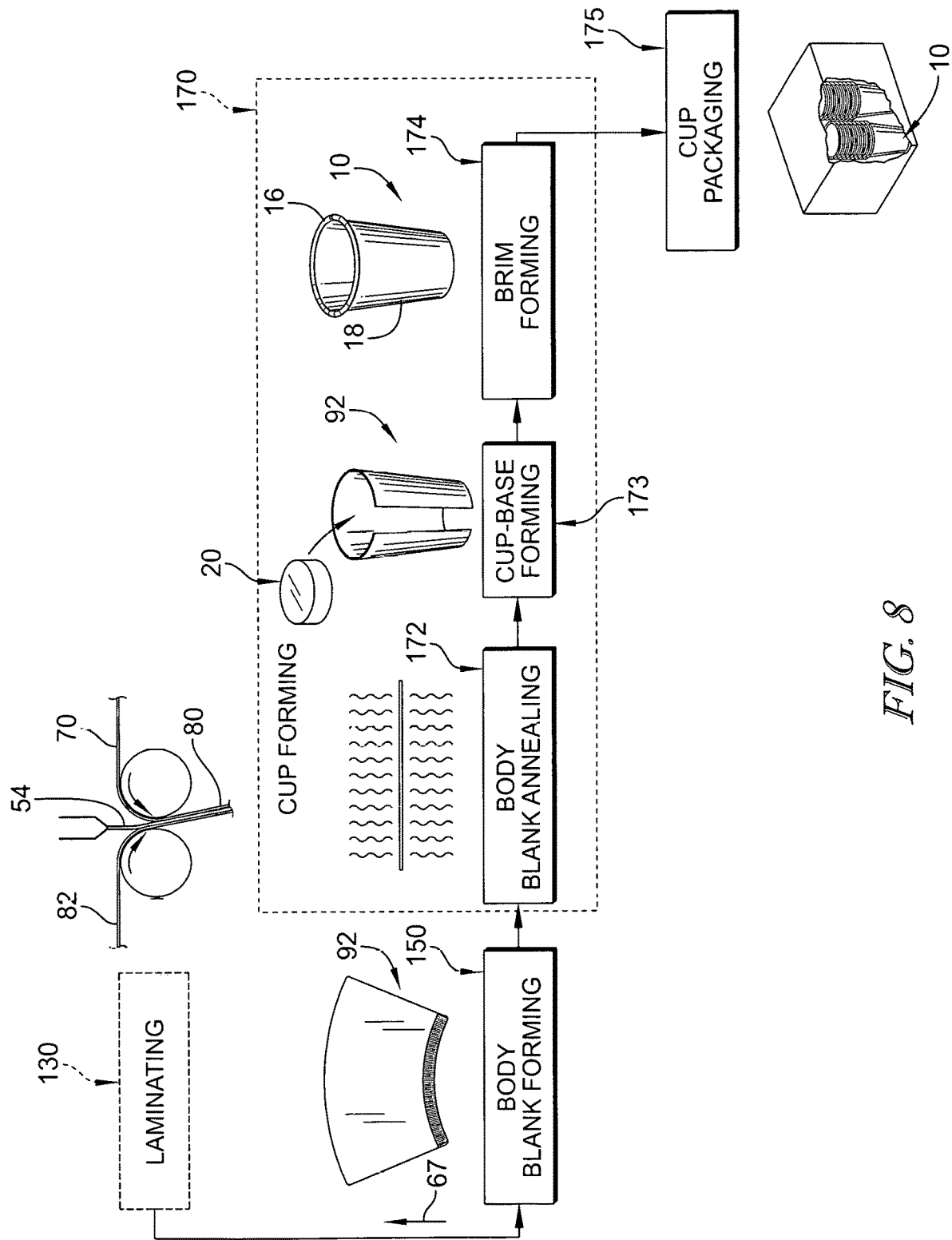

FIG. 6 is a diagrammatic and perspective view of a cup-forming process in accordance with the present disclosure showing that the cup-forming process includes, from left to right, extruding the insulative cellular non-aromatic polymeric material, extruding the polymeric-lamination into the junction of the insulative cellar non-aromatic polymeric material and the printed film to form a multi-layer sheet, forming a cup blank from the multi-layer sheet, forming a cup from the cup blank, and regrinding the scrap from the blank forming process to be used in the extruding step;

FIGS. 7A-7B are diagrammatic views of multi-layer sheets formed during the cup-forming process of FIG. 1;

FIG. 7A shows the film layer located between the ink layer and the polymer-lamination layer;

FIG. 7B shows the ink layer located between the film layer and the polymer-lamination layer; and FIG. 8 is a perspective and diagrammatic view of a cup-manufacturing process in accordance with the present disclosure showing that the cup-manufacturing process includes forming the multi-layer sheet, forming the insulative cup, and packaging stacks of insulative cups and showing that forming the insulative cup includes the steps of forming a body blank, annealing the body blank, forming a cup base, and forming a rolled brim.

DETAILED DESCRIPTION

Figure 2:
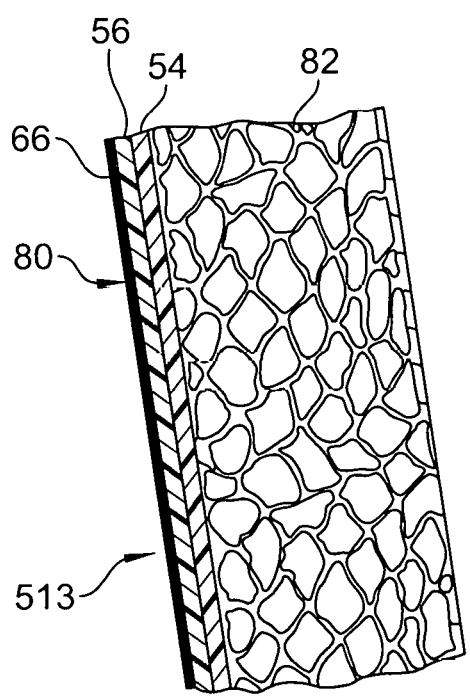
FIG. 2 is an enlarged sectional view of a portion of a side wall included in the body of the insulative cup of FIG. 1 showing that the side wall is made from a multi-layer sheet that includes, from left to right, a printed film layer comprising an ink layer and a film layer, a polymeric-lamination layer, and an insulative cellular non-aromatic polymer material.

An insulative cup 10 in accordance with the present disclosure is formed of a multi-layer sheet 80 as shown in FIGS. 1 and 2. Multi-layer sheet 80 comprises an insulative cellular non-aromatic polymeric material 82, a printed film layer 70, and a polymeric-lamination layer 54, as shown in FIGS. 1-4. The insulative cellular non-aromatic polymeric material 82, printed film layer 70, and polymeric-lamination layer 54 cooperate to provide insulative cup 10 having advantageous properties such as improved rigidity which allows for reduced density providing higher insulative properties.

Figure 3:
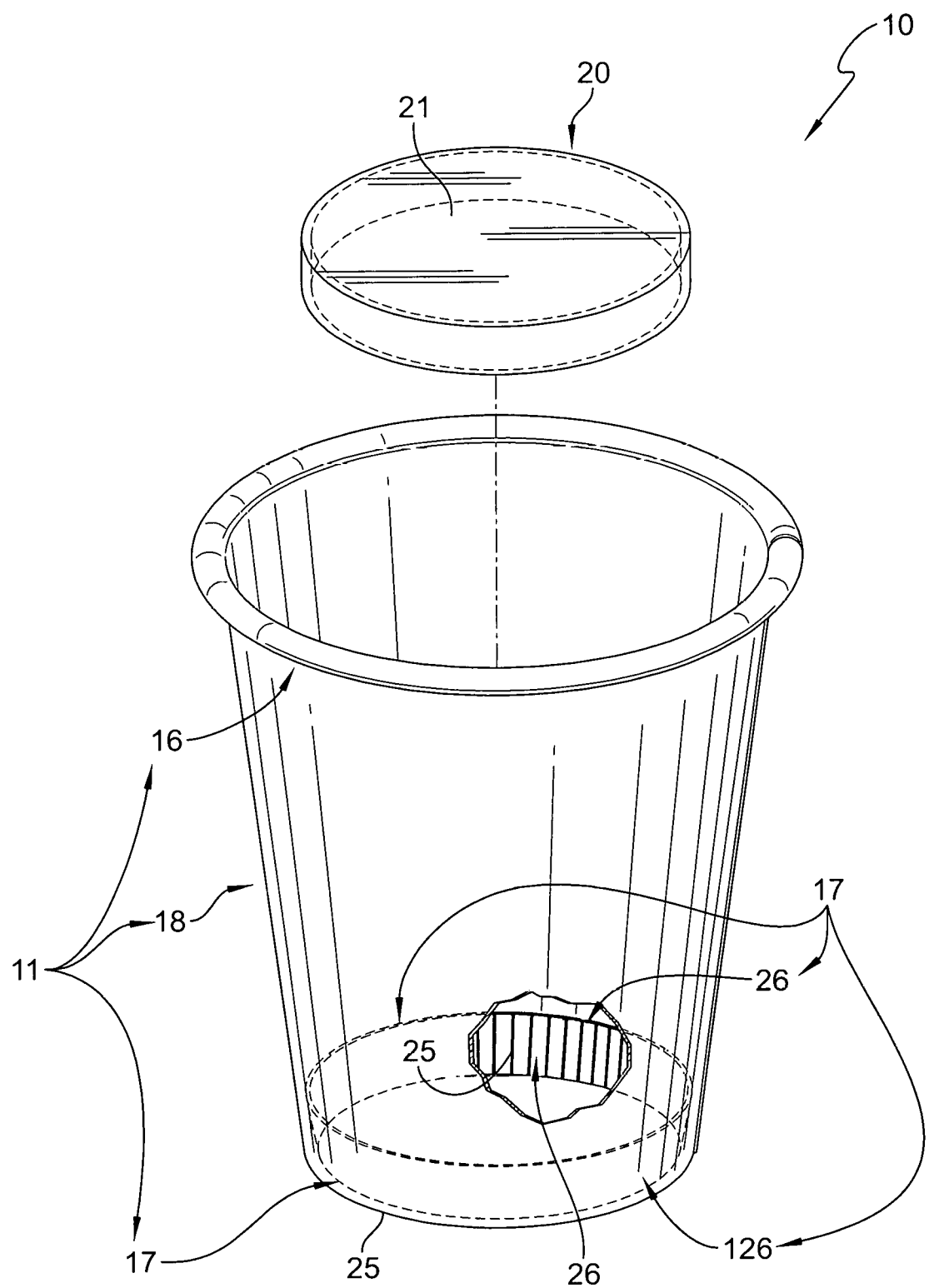
FIG. 3 is an exploded assembly view of the insulative cup of FIG. 1 showing that the insulative cup includes, from top to bottom, the floor and the body including a rolled brim, the side wall, and a support structure configured to mate with the floor as shown in FIG. 1.
Figure 4:
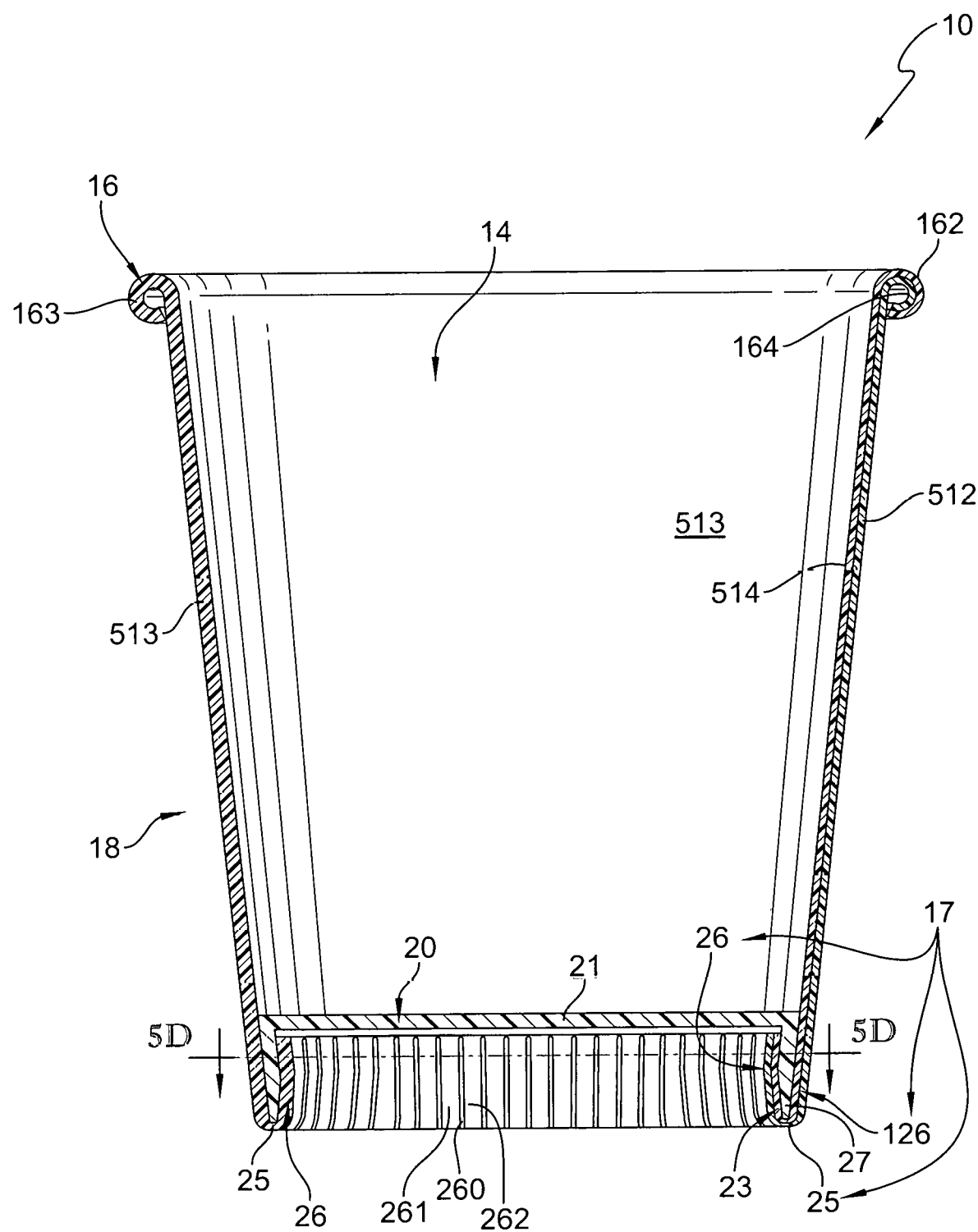
FIG. 4 is a sectional view taken along line 4-4 of FIG. 1 showing that the side wall included in the body of the insulative cup includes a generally uniform thickness and showing that the floor is coupled to a floor mount included in the body.

Insulative cup 10 includes a body 11 having a sleeve-shaped side wall 18 and a floor 20 as shown in FIGS. 1, 3, and 4. Floor 20 is coupled to body 11 and cooperates with side wall 18 to form an interior region 14 therebetween for storing food, liquid, or any suitable product. Body 11 also includes a rolled brim 16 coupled to an upper end of side wall 18 and a floor mount 17 interconnecting a lower end of side wall 18 and floor 20 as shown in FIG. 7.

Body 11 is formed of multi-layer sheet 80 as suggested in FIGS. 6 and 8. Multi-layer sheet 80 includes insulative cellular non-aromatic polymeric material 82, polymeric-lamination layer 54, and printed film layer 70 as shown in FIGS. 7A and 7B. Insulative cellular non-aromatic polymeric material 82 comprises a polymeric foam and is configured to reduce the density of multi-layer sheet 80. Polymeric-lamination layer 54 extends between and interconnects insulative cellular non-aromatic polymeric material 82 and printed film layer 70. Printed film layer 70 includes a film layer 56 and an ink layer 66 printed onto film layer 56.

Multi-layer sheet 80 includes insulative cellular non-aromatic polymeric material 82, polymeric-lamination layer 54, and printed film layer 70, as shown in FIGS. 7A and B. Insulative cellular non-aromatic polymeric material 82 comprises a polymeric foam and is configured to reduce the density of multi-layer sheet 80. Polymeric-lamination layer 54 extends between and interconnects insulative cellular non-aromatic polymeric material 82 and printed film layer 70. Printed film layer 70 includes a film layer 56 and an ink layer 66 printed onto film layer 56. Illustratively, printed film layer 70 may form an outer surface 106 of cup 10. A portion of insulative cellular non-aromatic polymeric material 82 may form an inner surface 108 of cup 10.

Insulative cellular non-aromatic polymeric material 82 is configured in accordance with the present disclosure to provide means for enabling localized plastic deformation in at least one selected region of body 11 (e.g., side wall 18, rolled brim 16, floor mount 17, and a floor-retaining flange 26 included in floor mount 17) to provide (1) a plastically deformed first material segment having a first density in a first portion of the selected region of body 11 and (2) a second material segment having a relatively lower second density in an adjacent second portion of the selected region of body 11 as suggested, for example, in FIG. 4. In illustrative embodiments, the first material segment is thinner than the second material segment.

One aspect of the present disclosure provides a formulation for manufacturing an insulative cellular non-aromatic polymeric material 82. As referred to herein, an insulative cellular non-aromatic polymeric material 82 refers to an extruded structure having cells formed therein and has desirable insulative properties at given thicknesses. Another aspect of the present disclosure provides a polymeric formulation for manufacturing an extruded structure of insulative cellular non-aromatic polymeric material. Still another aspect of the present disclosure provides an extrudate comprising an insulative cellular non-aromatic polymeric material. Yet another aspect of the present disclosure provides a structure of material formed from an insulative cellular non-aromatic polymeric material. A further aspect of the present disclosure provides a container formed from an insulative cellular non-aromatic polymeric material.

A potential feature of an insulative cup formed of insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to minimize deformation of the cup as the cup is being handled by a user.

In illustrative examples, cup 10 has a rigidity as measured in accordance with the Examples described herein. The measured rigidity of cup 10 may be at least 0.25 kg-F, at least 0.275 kg-F, at least 0.3 kg-F, at least 0.325 kg-F, at least 0.35 kg-F, at least 0.4 kg-F, at least 0.5 kg-F, at least 0.6 kg-F, at least 0.7 kg-F, or at least 0.75 kg-F. In some embodiments, the measured rigidity of cup 10 may be selected from a first set of ranges of from about 0.2 kg-F to about 0.50 kg-F, about 0.25 kg-F to about 0.5 kg-F, about 0.25 kg-F to about 0.45 kg-F, about 0.3 kg-F to about 0.45 kg-F, about 0.315 kg-F to about 0.45 kg-F, about 0.325 kg-F to about 0.45 kg-F, about 0.325 kg-F to about 0.425 kg-F. In some embodiments, the measured rigidity of cup 10 may be selected from a second set of ranges of from about 0.3 kg-F to about 1.5 kg-F, about 0.3 kg-F to about 1.3 kg-F, about 0.3 kg-F to about 1.1 kg-F, about 0.3 kg-F to about 0.9 kg-F, about 0.4 kg-F to about 0.9 kg-F, about 0.5 kg-F to about 0.9 kg-F, about 0.5 kg-F to about 0.8 kg-F, or about 0.6 kg-F to about 0.8 kg-F.

In some embodiments, the cup has a rigidity as measured when the cup is filled with cold, room temperature, or hot water and if the cup comprises a lid coupled with the brim. In some exemplary embodiments, the cup has a cold fill lidded rigidity of at least about 1 kg-F. In some embodiments, the cup has a cold fill lidded rigidity of less than about 1.5 kg-F. In some exemplary embodiments, the cup has a cold fill unlidded rigidity of at least about 0.5 kg-F. In some embodiments, the cup has a cold fill unlidded rigidity of less than about 1.2 kg-F. In some exemplary embodiments, the cup has a hot fill lidded rigidity of at least about 0.35 kg-F. In some embodiments, the cup has a hot fill lidded rigidity of less than about 0.75 kg-F. In some exemplary embodiments, the cup has a hot fill unlidded rigidity of at least about 0.2 kg-F. In some embodiments, the cup has a hot fill unlidded rigidity of less than about 0.5 kg-F. In some exemplary embodiments, the cup has a room temperature fill lidded rigidity of at least about 0.6 kg-F. In some embodiments, the cup has a room temperature fill lidded rigidity of less than about 1.7 kg-F. In some exemplary embodiments, the cup has a room temperature fill unlidded rigidity of at least about 0.3 kg-F. In some embodiments, the cup has a room temperature fill unlidded rigidity of less than about 1 kg-F. In some exemplary embodiments, the cup has a room temperature unfilled lidded rigidity of at least about 0.6 kg-F. In some embodiments, the cup has a room temperature fill lidded rigidity of less than about 1.7 kg-F. In some exemplary embodiments, the cup has a room temperature unfilled unlidded rigidity of at least about 0.3 kg-F. In some embodiments, the cup has a room temperature fill unlidded rigidity of less than about 1 kg-F.

Body 11 is formed from a strip of multi-layer sheet 80 as disclosed herein. In accordance with the present disclosure, a strip of multi-layer sheet 80 is configured (by application of pressure—with or without application of heat) to provide means for enabling localized plastic deformation in at least one selected region of body 11 to provide a plastically deformed first material segment having a first density located in a first portion of the selected region of body 11 and a second material segment having a second density lower than the first density located in an adjacent second portion of the selected region of body 11 without fracturing the insulative cellular non-aromatic polymeric material so that a predetermined insulative characteristic is maintained in body 11.

Sleeve-shaped side wall 18 includes an upright inner tab 514, an upright outer tab 512, and an upright fence 513 extending between inner and outer tabs 514, 512 as suggested in FIGS. 4 and 5A-D. Upright inner tab 514 is arranged to extend upwardly from floor 20 and configured to provide the first material segment having the higher first density in the first region 101 of the selected regions of body 11. Upright outer tab 512 is arranged to extend upwardly from floor 20 and to mate with upright inner tab 514 along an interface therebetween as suggested in FIG. 4. Upright fence 513 is arranged to interconnect upright inner and outer tabs 514, 512 and surround interior region 14. Upright fence 513 is configured to provide the second material segment having the lower second density in the first region of the selected regions of body 11 and cooperate with upright inner and outer tabs 514, 512 to form sleeve-shaped side wall 18.

Figure 5A:
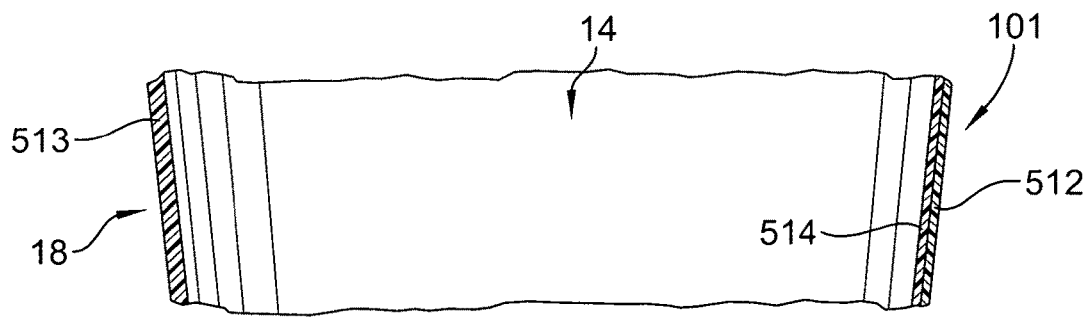
FIGS. 5A-5D are a series of views showing first, second, third, and fourth regions of the insulative cup of FIG. 1 that each include localized plastic deformation.
Figure 5B:
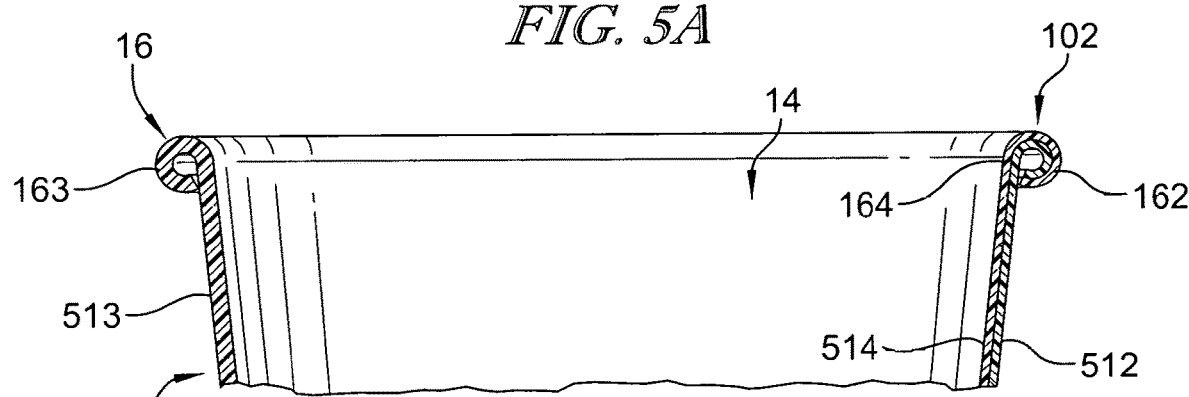

A second region of the selected regions of body 11 in which localized plastic deformation is enabled by the insulative cellular non-aromatic polymeric material is in a rolled brim 16 included in body 11 as suggested in FIGS. 4 and 5B. Rolled brim 16 is coupled to an upper end of sleeve-shaped side wall 18 to lie in spaced-apart relation to floor 20 and to frame an opening into interior region 14. Rolled brim 16 includes an inner rolled tab 164, an outer rolled tab 162, and a rolled lip 163 as suggested in FIG. 4. Inner rolled tab 164 is configured to provide the first material segment having the higher first density in the second region 102 of the selected regions of body 11. Inner rolled tab 164 is coupled to an upper end of upright outer tab 162 included in sleeve-shaped side wall 18. Outer rolled tab 162 is coupled to an upper end of upright inner tab 514 included in sleeve-shaped side wall 18 and to an outwardly facing exterior surface of inner rolled tab 164. Rolled lip 163 is arranged to interconnect oppositely facing side edges of each of inner and outer rolled tabs 164, 162. Rolled lip 163 is configured to provide the second material segment having the lower second density in the second 102 of the selected region of body 11 and cooperate with inner and outer rolled tabs 164, 162 to form rolled brim 16 as suggested in FIG. 1.

Figure 5C:
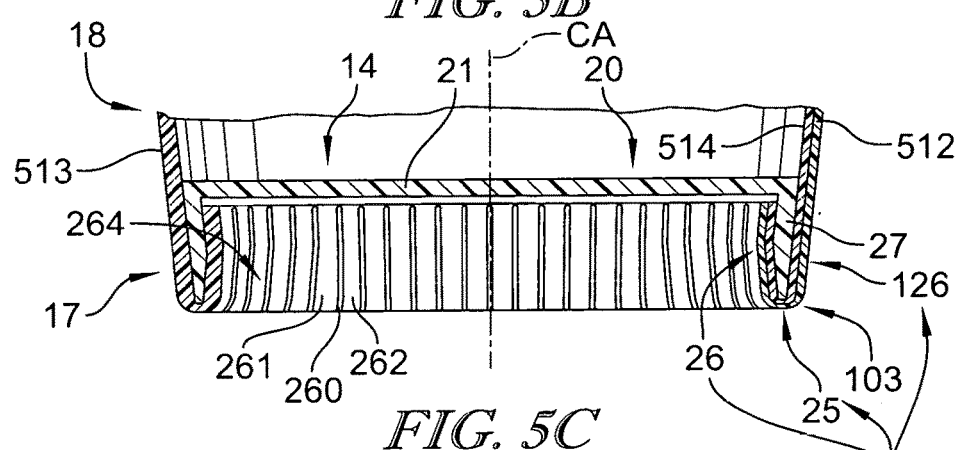

A third region of the selected regions of body 11 in which localized plastic deformation is enabled by the insulative cellular non-aromatic polymeric material is in a floor mount 17 included in body 11 as suggested in FIGS. 1 and 5C. Floor mount 17 is coupled to a lower end of sleeve-shaped side wall 18 to lie in spaced-apart relation to rolled brim 16 and to floor 20 to support floor 20 in a stationary position relative to sleeve-shaped side wall 18 to form interior region 14. Floor mount 17 includes a web-support ring 126, a floor-retaining flange 26, and a connecting web 25 extending between web-support ring 126 and floor-retaining flange 26 as suggested in FIG. 4. Web-support ring 126 is coupled to the lower end of sleeve-shaped side wall 18 and configured to provide the second material segment having the lower second density in the third region 103 of the selected regions of body 11. Floor-retaining flange 26 is coupled to floor 20 and arranged to be surrounded by web-support ring 126 as suggested in FIG. 4. Connecting web 25 is arranged to interconnect floor-retaining flange 26 and web-support ring 126. Connecting web 25 is configured to provide the first material segment having the higher first density in the third region 103 of the selected regions of body 11. Connecting web 25 is preformed in a body blank 92 in an illustrative embodiment before body blank 92 is formed to define insulative cup 10.

Figure 5D:
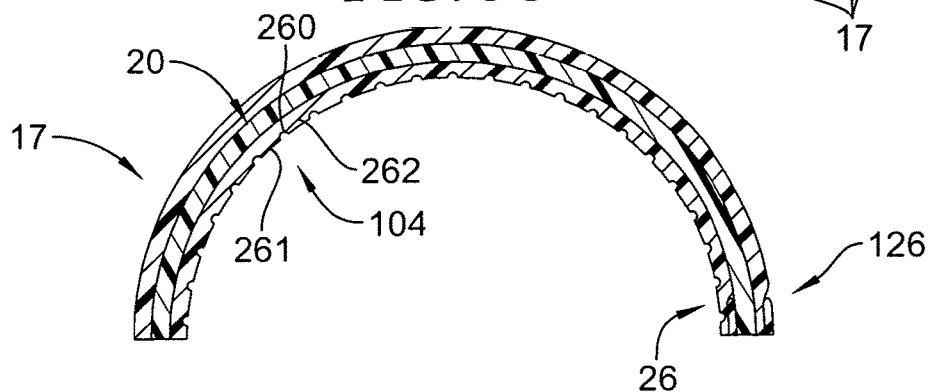

A fourth region 104 of the selected regions of body 11 in which localized plastic deformation is enabled by the insulative cellular non-aromatic polymeric material is in floor-retaining flange 26 of floor mount 17 as suggested in FIGS. 1 and 5D. Floor-retaining flange 26 includes an alternating series of upright thick and thin staves arranged in side-to-side relation to extend upwardly from connecting web 25 toward interior region 14 bounded by sleeve-shaped side wall 18 and floor 20. This alternating series of thick and thin staves is preformed in a body blank 92 in an illustrative embodiment before body blank 923 is formed to define insulative cup 10. As suggested in FIG. 5D, a first 261 of the upright thick staves is configured to include a right side edge extending upwardly from web 25 toward interior region 14. A second 262 of the upright thick staves is configured to include a left side edge arranged to extend upwardly from web 25 toward interior region 14 and lie in spaced-apart confronting relation to right side edge of the first 261 of the upright thick staves. A first 260 of the upright thin staves is arranged to interconnect right side edge of the first 261 of the upright thick staves and left side edge of the second 262 of the upright thick staves and to cooperate with left and right side edges to define therebetween a vertical channel opening inwardly into a lower interior region bounded by floor-retaining flange 26 and a horizontal platform 21 included in floor 20 and located above floor-retaining flange 26 as suggested in FIGS. 4 and 5C. The first 260 of the upright thin staves is configured to provide the first material segment having the higher first density in the fourth region of the selected regions of body 11. The first 261 of the upright thick staves is configured to provide the second material segment having the lower second density in the fourth region of the selected regions of the body 11.

Sleeve-shaped side wall 18 of body 11 includes a pair of tabs 514, 512 that mate to provide side wall 18 with a frustoconical shape in the illustrative embodiment shown in FIGS. 1 and 4. Upright inner tab 514 of side wall 18 includes an inner surface bounding a portion of interior region 14 and an outer surface facing toward upright outer tab 512. Upright outer tab 512 includes an inner surface facing toward interior region 14 and mating with outer surface of upright inner tab 514 to define the interface between upright inner and outer tabs 514, 512. Upright outer tab 512 further includes an outer face facing away from upright inner tab 514. Each of inner and outer surfaces of upright inner and outer tabs 514, 512 has an arcuate shape in a horizontal cross-section.

Upright fence 513 of side wall 18 is C-shaped in a horizontal cross-section and each of upright inner and outer tabs 514, 512 has an arcuate shape in a horizontal cross-section. Upright fence 513 includes an upright left side edge and an upright right side edge that is arranged to lie in spaced-apart confronting relation to upright left side edge. Upright outer tab 512 is configured to have the higher first density and mate with upright inner tab 514 also characterized by the higher first density to establish a bridge 512, 514 arranged to interconnect upright left and right side edges of upright fence 513. The bridges are formed of a plastically deformed material having the higher first density.

Upright fence 513 of side wall 18 has an inner surface bounding a portion of interior region 14 and an outer surface facing away from interior region 14 and surrounding inner surface of upright fence 513. The outer surface cooperates with the inner surface of upright fence 513 to define a first thickness therebetween. Upright inner tab 514 includes an inner surface bounding a portion of interior region 14 and an outer surface facing toward upright outer tab 512. Upright outer tab 512 includes an inner surface facing toward interior region 14 and mating with the outer surface of upright inner tab 514 to define the interface between upright inner and outer tabs 514, 512. Upright outer tab 512 further includes an outer face facing away from upright inner tab 514. Inner and outer surfaces of upright inner tab 514 cooperate to define a second thickness therebetween that is less than the first thickness. Inner and outer surfaces of upright outer tab 512 cooperate to define a third thickness that is less than the first thickness.

Rolled brim 16 of body 11 is coupled to an upper end of sleeve-shaped side wall 18 to lie in spaced-apart relation to floor 20 and to frame an opening into interior region 14 as suggested in FIGS. 1 and 5B. Inner rolled tab 164 of rolled brim 16 is configured to provide the plastically deformed first material segment having the higher first density and to include oppositely facing left and right side edges. Rolled lip 163 of rolled brim 16 is arranged to interconnect the oppositely facing left and right side edges of inner rolled tab 164 and configured to provide the second material segment having the lower second density. Outer rolled tab 162 of rolled brim 16 is coupled to an outwardly facing surface of inner rolled tab 164 as suggested in FIG. 1 to provide an outer shell covering inner rolled tab 164 and formed of a plastically deformed material having the higher first density. Outer rolled tab 162 includes oppositely facing left and right side edges. Rolled lip 163 is arranged to interconnect the oppositely facing left and right side edges of outer rolled tab 162. Rolled lip 163 is C-shaped in horizontal cross-section. Each of inner and outer rolled tabs 164, 162 has an arcuate shape between the oppositely facing left and right side edges thereof to provide rolled brim 16 with an annular shape.

Floor mount 17 of body 11 is coupled to a lower end of sleeve-shaped side wall 18 and to floor 20 to support floor 20 in a stationary position relative to sleeve-shaped side wall 18 to form interior region 14 as suggested in FIGS. 1 and 5C. Floor mount 17 includes a floor-retaining flange 26 coupled to floor 20, a web-support ring 126 coupled to the lower end of sleeve-shaped side wall 18 and arranged to surround floor-retaining flange 26, and a connecting web 25 arranged to interconnect floor-retaining flange 26 and web-support ring 126 as suggested in FIG. 5C. Connecting web 25 is configured to provide the first material segment having the higher first density. Connecting web-support ring 126 is configured to provide the second material segment having the lower second density. Each of connecting web 25 and web-support ring 126 has an annular shape. Floor-retaining flange 26 has an annular shape. Each of floor-retaining flange 26, connecting web 25, and web-support ring 126 includes an inner layer having an interior surface mating with floor 20 and an overlapping outer layer mating with an exterior surface of an inner layer as suggested in FIG. 4.

Floor 20 of insulative cup 10 includes a horizontal platform 21 bounding a portion of interior region 14 and a platform-support member 23 coupled to horizontal platform 21 as shown, for example, in FIGS. 3 and 5C. Platform-support member 23 is ring-shaped and arranged to extend downwardly away from horizontal platform 21 and interior region 14 into a space 27 provided between floor-retaining flange 26 and the web-support ring 126 surrounding floor-retaining flange 26 to mate with each of floor-retaining flange 26 and web-support ring 126 as suggested in FIG. 5C.

Platform-support member 23 of floor 20 has an annular shape and is arranged to surround floor-retaining flange 26 and lie in an annular space provided between horizontal platform 21 and connecting web 25 as suggested in FIGS. 4, 5C, and 5D. Each of floor-retaining flange 26, connecting web 25, and web-support ring 126 includes an inner layer having an interior surface mating with floor 20 and an overlapping outer layer mating with an exterior surface of the inner layer as suggested in FIG. 4. The inner layer of each of floor-retaining flange 26, web 25, and web-support ring 126 is arranged to mate with platform-support member 23 as suggested in FIG. 5C.

Floor-retaining flange 26 of floor mount 17 is arranged to lie in a stationary position relative to sleeve-shaped side wall 18 and coupled to floor 20 to retain floor 20 in a stationary position relative to sleeve-shaped side wall 18 as suggested in FIGS. 4 and 5C, and 64. Horizontal platform 21 of floor 20 has a perimeter edge mating with an inner surface of sleeve-shaped side wall 18 and an upwardly facing top side bounding a portion of interior region 14 as suggested in FIGS. 4 and 5C.

Floor-retaining flange 26 of floor mount 17 is ring-shaped and includes an alternating series of upright thick and thin staves arranged to lie in side-to-side relation to one another to extend upwardly toward a downwardly facing underside of horizontal platform 21. A first 261 of the upright thick staves is configured to include a right side edge extending upwardly toward the underside of horizontal platform 21. A second 262 of the upright thick staves is configured to include a left side edge arranged to extend upwardly toward underside of horizontal platform 21 and lie in spaced-apart confronting relation to right side edge of the first 261 of the upright thick staves. A first 260 of the upright thin staves is arranged to interconnect left and right side edges and cooperate with left and right side edges to define therebetween a vertical channel opening inwardly into a lower interior region 264 bounded by horizontal platform 21 and floor-retaining flange 26 as suggested in FIG. 5. The first 260 of the thin staves is configured to provide the first material segment having the higher first density. The first 261 of the thick staves is configured to provide the second material segment having the lower second density.

Floor-retaining flange 26 of floor mount 17 has an annular shape and is arranged to surround a vertically extending central axis CA intercepting a center point of horizontal platform 21 as suggested in FIGS. 5C and 5D. The first 260 of the thin staves has an inner wall facing toward a portion of the vertically extending central axis CA passing through the lower interior region. Platform-support member 23 is arranged to surround floor-retaining flange 26 and cooperate with horizontal platform 21 to form a downwardly opening floor chamber containing the alternating series of upright thick and thin staves therein.

Insulative cup 10 in accordance with one exemplary embodiment of the present disclosure includes a base 12 formed to include an interior region 14 and a rolled brim 16 coupled to base 12 as shown, for example, in FIG. 1. Base 12 includes side wall 18, a support structure 19, and floor 20 as shown in FIG. 1. Floor 20 is coupled to support structure 19 and side wall 18 to define interior region 14. Base 12 illustratively comprises an insulative cellular non-aromatic polymeric material that is configured (by application of pressure—with or without application of heat) to provide means for insulating a beverage or food placed in interior region 14, forming a structure having sufficient mechanical characteristics to support the beverage or food, and providing resistance to deformation and puncture.

Side wall 18 extends between rolled brim 16 and support structure 19 as shown in FIG. 4. Side wall 18 includes a top portion 22 of base 12 that is coupled to rolled brim 16 and a bottom portion 24 that is coupled to support structure 19. Support structure 19 is arranged to interconnect floor 20 and bottom portion 24 of side wall 18. In the illustrative embodiment, brim 16, side wall 18, and support structure 19 are formed from a unitary body blank 92 as suggested in FIG. 6. Insulative cup 10 is an assembly comprising the body blank 92 and the floor 20. As an example, floor 20 is mated with bottom portion 24 during cup-manufacturing process to form a primary seal therebetween. A secondary seal may also be established between support structure 19 and floor 20. An insulative container may be formed with only the primary seal, only the secondary seal, or both the primary and secondary seals.

Referring again to FIG. 1, top portion 22 of side wall 18 is arranged to extend in a downward direction toward floor 20 and is coupled to bottom portion 24. Bottom portion 24 is arranged to extend in an opposite upward direction toward rolled brim 16. Top portion 22 is curled during cup-manufacturing process 100 to form rolled brim 16. Rolled brim 16 and top portion 22 cooperate to form a mouth 32 that is arranged to open into interior region 14.

Support structure 19 includes a floor-retaining flange 26 and a connecting web 25 as shown in FIG. 4. Connecting web 25 is coupled to bottom portion 24 of side wall 18 and arranged to extend radially away from bottom portion 24 toward interior region 14. Floor-retaining flange 26 is coupled to connecting web 25 and is arranged to extend in upward direction toward floor 20 and interior region 14. Together, floor-retaining flange 26, connecting web 25, and bottom portion 24 cooperate to define receiving well 27 therebetween. As suggested in FIG. 4, a portion of floor 20 is arranged to extend downwardly into receiving well 27 and be retained between floor-retaining flange 26 and bottom portion 24. In the illustrative embodiment of FIG. 4, platform-support member 23 of floor 20 extends completely into receiving well 27 and contacts connecting web 25.

As shown in FIGS. 1, 3, and 5C, floor 20 includes horizontal platform 21 and a platform-support member 23. Horizontal platform 21 is, for example, a flat round disc which cooperates with side wall 18 to define interior region 14 therebetween. Platform-support member 23 is coupled to a perimeter of horizontal platform 21 and is arranged to extend in downward direction away from horizontal platform 21 toward and into receiving well 27. As a result, horizontal platform 21 is spaced apart from any surface on which insulative cup 10 rests.

The compressibility of the insulative cellular non-aromatic polymeric material used in accordance with the present disclosure to produce insulative cup 10 allows the insulative cellular non-aromatic polymeric material to be prepared for the mechanical assembly of insulative cup 10, without limitations experienced by other polymeric materials. The cellular nature of the insulative cellular non-aromatic polymeric material disclosed herein provides insulative characteristics as discussed below, while susceptibility to plastic deformation permits yielding of the insulative cellular non-aromatic polymeric material without fracture. The plastic deformation experienced when the strip of insulative cellular non-aromatic polymeric material is subjected to a pressure load is used to form a permanent set in the insulative cellular non-aromatic polymeric material after the pressure load has been removed. In some locations, the locations of the permanent set are positioned in illustrative embodiments to provide, for example, controlled gathering of the insulative cellular non-aromatic polymeric material.

Plastic deformation may also be used to create fold lines in the insulative cellular non-aromatic polymeric material to control deformation of the material when being worked during a cup assembly process. When deformation is present, the absence of material in the voids formed by the deformation provides relief to allow the material to be folded easily at the locations of deformation Each first material segment in the insulative cellular non-aromatic polymeric material has a relatively thin first thickness. Each companion second material segment in the insulative cellular non-aromatic polymeric material has a relatively thicker second thickness.

Body 11 is formed from multi-layer sheet 80 of insulative cellular non-aromatic polymeric material that includes, for example, a strip of insulative cellular non-aromatic polymeric material 82 and printed film layer 70 coupled to one side of the strip of insulative cellular non-aromatic polymeric material as shown in FIG. 2. In one embodiment of the present disclosure, text and artwork or both can be printed on a film included in printed film layer 70. In some embodiments, ink layer 66 is applied to the film to locate the ink layer between the film and the strip of insulative cellular non-aromatic polymeric material as shown in FIG. 7B. In another embodiment, ink layer 66 is applied to the film 56 to locate film layer 56 between the ink layer 66 and the strip of insulative cellular non-aromatic polymeric material 82 as shown in FIG. 7A. As an example, film layer 56 may comprise biaxially oriented polypropylene (BOPP).

The insulative cellular non-aromatic polymeric material comprises, for example, a polypropylene base resin having a high melt strength, one or both of a polypropylene copolymer and homopolymer resin, and one or more cell-forming agents. As an example, cell-forming agents may include a primary nucleation agent, a secondary nucleation agent, and a blowing agent defined by gas means for expanding the resins and to reduce density. In one example, the gas means comprises carbon dioxide. In another example, the base resin comprises broadly distributed molecular weight polypropylene characterized by a distribution that is unimodal and not bimodal.

Illustratively, each of insulative cellular non-aromatic polymeric material 82, polymeric-lamination layer 54, and film layer 56 comprise a polymeric material. The polymeric material for each of insulative cellular non-aromatic polymeric material 82, polymeric-lamination layer 54, and film layer 56 can be made, for example, by extruding a formulation. It should be understood that many of the ranges described herein for the formulation apply with equal weight to the extruded polymeric material, except that in some examples the chemical nucleating agent will decompose upon heating. The decomposition of the chemical nucleating agent could cause the relative weight percentages of the remaining components to increase slightly.

As an example, a polymeric formulation for forming insulative cellular non-aromatic polymeric material 82 comprises a base resin blend. In some embodiments, the base resin blend comprises a high melt strength, a polypropylene copolymer, polypropylene homopolymer, or a mixture thereof. In some embodiments, the formulation may comprise cell-forming agents including a chemical nucleating agent and a physical blowing agent such as carbon dioxide. As a further example, insulative cellular non-aromatic polymeric material 82 further comprises a slip agent. As an example, one polypropylene resin has a broadly distributed unimodal (not bimodal) molecular weight distribution.

In exemplary embodiments, a polymeric formulation comprises a base resin blend comprising at least two materials. In some embodiments, the base resin blend comprises a first polymer and a second polymer. In some embodiments, the first polymer is a polypropylene. In some embodiments, the second polymer is a polypropylene. In some embodiments, the first polymer is a polypropylene and the second polymer is a polypropylene. In one exemplary embodiment, a first or second polypropylene polymer comprises a high melt strength polypropylene that has long chain branching. In one exemplary embodiment, the first or second polypropylene polymer also has non-uniform dispersity. In some embodiments, the first polypropylene polymer is a polypropylene homopolymer. In some embodiments, the second polypropylene is a polypropylene homopolymer. In some embodiments, the base resin blend comprises a first polypropylene homopolymer and a second polypropylene homopolymer.

Other polypropylene polymers having suitable melt strength, branching, and melting temperature may also be used. Several base resins may be used and mixed together.

In some embodiments, the base resin blend comprises a polymer that may be, for example, a polymer with sufficient crystallinity. The polymer may also be, for example, a polymer with sufficient crystallinity and melt strength. In exemplary embodiments, the polymer may be at least one crystalline polypropylene homopolymer, an impact polypropylene copolymer, mixtures thereof, or the like. One illustrative example is a high crystalline polypropylene homopolymer, available as F020HC from Braskem. Another illustrative example is an impact polypropylene copolymer commercially available as PRO-FAX SC204™ (available from LyondellBasell Industries Holdings, B.V.). Another illustrative example is Homo PP—INSPIRE 222, available from Braskem. Another illustrative example is the commercially available polymer known as PP 527K, available from Sabic. Another illustrative example is a polymer commercially available as XA-11477-48-1 from LyondellBasell Industries Holdings, B.V. In one aspect the polypropylene polymer may have a high degree of crystallinity, i.e., the content of the crystalline phase exceeds 51% (as tested using differential scanning calorimetry) at 10° C./min cooling rate. In exemplary embodiments, several different polymers may be used and mixed together.

In exemplary embodiments, the base resin blend may comprise polyethylene. In exemplary embodiments, the base resin blend may comprise low-density polyethylene, linear low-density polyethylene, high-density polyethylene, ethylene-vinyl acetate copolymers, ethylene-ethylacrylate copolymers, ethylene-acrylic acid copolymers, polymethylmethacrylate mixtures of at least two of the foregoing and the like. The use of non-polypropylene materials may affect recyclability, insulation, microwavability, impact resistance, or other properties, as discussed further hereinbelow.

In illustrative embodiments, a polymeric formulation comprises a base resin blend. In illustrative embodiments, the base resin blend may include a polypropylene. In illustrative embodiments, an insulative cellular non-aromatic polymeric material comprises a polypropylene having high melt strength, a polypropylene copolymer or homopolymer (or both). It is within the scope of the present disclosure to select an amount of base resin blend of the polymeric formulation to be one of the following values: about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, about 99.5%, and about 99.9% by weight of the polymeric formulation. It is within the present disclosure for the amount of base resin blend in the polymeric formulation to fall within one of many different ranges. In a first set of ranges, the range of base resin blend of the polymeric formulation is one of the following ranges: about 50% to about 99.9%, about 70% to about 99.9%, about 80% to about 99.9%, about 85% to about 99.9%, about 90% to about 99.9%, about 95% to about 99.9%, about 98% to about 99.9%, and about 99% to about 99.9% by weight of the polymeric formulation. In a second set of ranges, the range of base resin blend in the polymeric formulation is one of the following ranges: about 85% to about 99%, about 85% to about 98%, about 85% to about 95%, and about 85% to about 90% by weight of the polymeric formulation. In a third set of ranges, the range of base resin blend of the polymeric formulation is one of the following ranges: about 50% to about 99%, about 50% to about 95%, about 50% to about 85%, about 55% to about 85%, about 80% to about 90%, about 80% to about 95%, about 90% to about 99%, and about 95% to about 98% by weight of the polymeric formulation. Each of these values and ranges is embodied in Examples 1 to 12. As defined hereinbefore, the base resin blend may comprise any suitable polymeric material. In addition, the ranges disclosed herein for the formulation apply with equal weight to the ranges for the polymeric material.

In illustrative embodiments, the base resin blend comprises a polypropylene. In some embodiments, the base resin blend comprises a first polymer and a second polymer. In some embodiments, the first polymer is a first polypropylene. In some embodiments, the polypropylene is a first polypropylene homopolymer. In some embodiments, the first polypropylene homopolymer is DAPLOY™ WB140 homopolymer (available from *Borealis* A/S). It is within the scope of the present disclosure to select an amount of the first polymer of the base resin blend to be one of the following values: about 40%, about 50%, about 55%, about 60%, about 65%, about 70%, about 75%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, or about 99% by weight of the base resin blend. It is within the present disclosure for the amount of the first polymer of the base resin blend to fall within one of many different ranges. In a first set of ranges, the range of first polymer in the base resin blend is one of the following ranges: about 40% to about 99%, about 60% to about 99%, about 70% to about 99%, about 80% to about 99%, or about 85% to about 99.9% by weight of the base resin blend. In a second set of ranges, the range of first polymer in the base resin blend is one of the following ranges: about 40% to about 97%, about 40% to about 95%, about 40% to about 92%, or about 40% to about 90% by weight of the base resin blend. In a third set of ranges, the range of first polymer in the base resin blend is one of the following ranges: about 50% to about 99%, about 50% to about 95%, about 60% to about 95%, about 65% to about 95%, about 65% to about 92%, about 70% to about 92%, about 75% to about 92%, or about 80% to about 92% by weight of the base resin blend.

In illustrative embodiments, the base resin blend includes a second polymer. In some embodiments, the second polymer is a polyethylene. In some embodiments, the second polymer is a polypropylene. In some embodiments, the second polypropylene is a second polypropylene homopolymer. In some embodiments, the second polypropylene is a second polypropylene copolymer. It is within the scope of the present disclosure to select an amount of the second polymer of the base resin blend to be one of the following values: about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40%, about 45%, about 50%, or about 60% by weight of the base resin blend. It is within the present disclosure for an amount of the second polymer of the base resin blend to fall within one of many different ranges. In a first set of ranges, the range of base resin is one of the following ranges: about 1% to about 60%, about 1% to about 50%, about 1% to about 40%, about 1% to about 30%, about 1% to about 25%, about 1% to about 20%, about 1% to about 15%, about 1% to about 10%, or about 1% to about 5% by weight of the base resin blend. In a second set of ranges, the range of the second polymer of the base resin blend is one of the following ranges: about 1% to about 50%, about 10% to about 60%, about 15% to about 60%, about 20% to about 60%, about 30% to about 60%, or about 40% to about 60% by weight of the base resin blend. In a third set of ranges, the range of second polymer of the base resin blend is one of the following ranges: about 2% to about 60%, about 2% to about 50%, about 2% to about 40%, about 2% to about 30%, about 4% to about 30%, about 4% to about 25%, about 4% to about 20%, about 5% to about 20%, about 5% to about 20%, or about 5% to about 15% by weight of the base resin blend. In an embodiment, the base resin blend lacks a second polymer. In a particular embodiment, a second polypropylene can be a high crystalline polypropylene homopolymer, such as F020HC (available from Braskem) or PP 527K (available from Sabic). In an embodiment, a polymeric material lacks a secondary resin.

The polymer resins may be blended with any additional desired components and melted to form a resin formulation mixture.

In some embodiments, one or more nucleating agents are used to provide and control nucleation sites to promote the formation of cells, bubbles, or voids in a molten resin during the extrusion process. A nucleating agent can be a chemical or physical material that provides sites, i.e. nucleation sites, for cells to form in the molten resin mixture. Nucleating agents may be physical agents or chemical agents. When a suitable temperature is reached, the nucleating agent acts to enable the formation of gas bubbles that create cells in the molten resin.

Suitable physical nucleating agents have a desirable particle size, aspect ratio, top-cut properties, shape, and surface compatibility. Examples include, but are not limited to, talc, $CaCO_3$, mica, kaolin clay, chitin, aluminosilicates, graphite, cellulose, and mixtures of at least two of the foregoing. The nucleating agent may be blended with the base resin blend that is introduced into hopper 113. Alternatively, the nucleating agent may be added to the molten resin mixture in an extruder 111.

After decomposition, the chemical nucleating agent forms small gas cells, which further serve as nucleation sites for larger cell growth from physical blowing agents or other types thereof. An illustrative example of a chemical nucleating agent is citric acid or a citric acid-based material. One representative example is Hydrocerol™ CF-40E™ (available from Clariant Corporation), which contains citric acid and a crystal nucleating agent. Another representative example is Hydrocerol™ CF-05E™ (available from Clariant Corporation), which contains citric acid and a crystal nucleating agent. In illustrative embodiments, one or more catalysts or other reactants may be added to accelerate or facilitate the formation of cells.

As described herein, the polymeric formulation may comprise a physical nucleating agent, a chemical nucleating agent, or both. In some embodiments, the nucleating agent is up to about 1%, up to about 3%, up to about 5%, up to about 7%, or up to about 10% by weight of the polymeric formulation. It is within the scope of the present disclosure to select an amount of a nucleating agent to be one of the following values: about 0%, about 0.5%, about 1%, about 1.5%, about 2%, about 2.5%, about 3%, about 4%, and about 5%, about 6%, about 7%, about 8%, about 9%, about 10%, about 12%, about 14%, by weight of the total formulation of the polymeric layer. It is also within the scope of the present disclosure for the weight percentage (w/w) of a nucleating agent to fall within one of many different ranges. In a first set of ranges, the weight percentage of a nucleating agent is one of the following ranges: about 0.1% to about 20% (w/w), about 0.25% to about 20%, about 0.5% to about 20%, about 0.75% to about 20%, about 1% to about 20%, about 1.5% to about 20%, about 2% to about 20%, about 2.5% to about 20%, about 3% to about 20%, about 4% to about 20%, about 4.5% to about 20%, and about 5% to about 20%. In a second set of ranges, the range of a nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 3% to about 10%, about 4% to about 10%, and about 5% to about 10% of the total formulation of the polymeric layer by weight percentage. In a third set of ranges, the range of a nucleating agent is one of the following ranges: about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation of the polymeric layer by weight percentage. The nucleating agent may be up to about 5%, up to about 10%, up to about 15%, up to about 20% by weight of the polymeric formulation. In an embodiment, the polymeric formulation lacks a nucleating agent.

In certain exemplary embodiments, one or more blowing agents may be incorporated. Blowing agent may be either a physical or a chemical material (or a combination of materials) that acts to expand nucleation sites. Illustratively, nucleating agents and blowing agents may work together to control the size and or quality of the formed cell. The blowing agent acts to reduce density by forming cells in the molten resin. The blowing agent may be added to the molten resin mixture in extruder 111 through a physical blowing agent port as suggested in FIG. 6.

In exemplary embodiments, physical blowing agents are typically gasses that are introduced as liquids under pressure into the molten resin via a port in the extruder as suggested in FIG. 6. As the molten resin passes through the extruder and the die head, the pressure drops causing the physical blowing agent to change phase from a liquid to a gas, thereby creating cells in the extruded resin. Excess gas blows off after extrusion with the remaining gas being trapped in the cells in the extrudate.

Illustrative physical blowing agents include agents that are gasses. Representative examples of physical blowing agents include, but are not limited to, carbon dioxide, nitrogen, helium, argon, air, water vapor, pentane, butane, other alkane mixtures of the foregoing and the like. In some embodiments, a physical blowing agent can be selected from the group consisting of carbon dioxide, nitrogen, helium, argon, methane, pentane, butane, ethane, propane, n-butane, isobutene, n-pentane, isopentane, neopentane, methyl fluoride, perfluoromethane, ethyl fluoride, 1,1-difluoroethane, 1,1,1-trifluoroethane, 1,1,1,2-tetrafluoro-ethane, pentafluoroethane, perfluoroethane, 2,2-difluoropropane, 1,1,1-trifluoropropane, perfluoropropane, perfluorobutane, perfluorocyclobutane, methyl chloride, methylene chloride, ethyl chloride, 1,1,1-trichloroethane, 1,1-dichloro-1-fluoroethane, 1-chloro-1,1-difluoroethane, 1,1-dichloro-2,2,2-trifluoroethane, 1-chloro-1,2,2,2-tetrafluoroethane, trichloromonofluoromethane, dichlorodifluoromethane, trichlorotrifluoroethane, dichlorotetrafluoroethane, chloroheptafluoropropane, dichlorohexafluoropropane, methanol, ethanol, n-propanol, and isopropanol. In certain exemplary embodiments, a processing aid may be added to the formulation to enhance the solubility of the physical blowing agent. Alternatively, the physical blowing agent may be a hydrofluorocarbon, such as 1,1,1,2-tetrafluoroethane, also known as R134a, a hydrofluoroolefin, such as, but not limited to, 1,3,3,3-tetrafluoropropene, also known as HFO-1234ze, or other haloalkane or haloalkane refrigerant. Selection of the blowing agent may be made to consider environmental impact.

One example of a physical blowing agent is nitrogen ($N_2$). The $N_2$ is pumped as a supercritical fluid into the molten formulation via a port in the extruder. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In an illustrative example, a physical blowing agent may be introduced at a rate of about 0.02 pounds per hour (lbs/h) to about 1.3 (lbs/h). In another illustrative example, the physical blowing agent may be introduced at a rate of about 0.03 (lbs/h) to about 1.25 (lbs/h). In another illustrative example, the physical blowing agent may be introduced at a rate of about 0.02 (lbs/h) to about 0.15 (lbs/h). In another illustrative example, the physical blowing agent may be introduced at a rate of about 0 (lbs/h) to about 0.15 (lbs/h). In another illustrative example, the physical blowing agent may be introduced at a rate of about 0.02 (lbs/h) to about 0.22 (lbs/h). In another illustrative example, the physical blowing agent may be introduced at a rate of about 0.02 (lbs/h) to about 0.25 (lbs/h). In still yet another illustrative example the physical blowing agent may be introduced at a rate of about 0.07 (lbs/h) to about 0.27 (lbs/h). In some embodiments, the physical blowing agent is used between about 0.01 lbs/h to about 0.2 lbs/h, about 0.01 lbs/h to about 0.17 lbs/h, about 0.01 lbs/h to about 0.15 lbs/h, about 0.01 lbs/h to about 0.1 lbs/h, about 0.05 lbs/h to about 0.2 lbs/h, about 0.05 lbs/h to about 0.17 lbs/h, about 0.05 lbs/h to about 0.15 lbs/h, about 0.05 lbs/h to about 0.1 lbs/h, about 0.1 lbs/h to about 0.2 lbs/h, about 0.1 lbs/h to about 0.17 lbs/h, or about 0.1 lbs/h to about 0.15 lbs/h.

In further embodiments, the physical blowing agent is measured in saturation percentage (%). In exemplary embodiments, physical blowing agent saturation can have a range that is about 0.1% to about 0.4%, about 0.1% to about 0.35%, about 0.1% to about 0.3%, about 0.1% to about 0.25%, 0.15% to about 0.4%, about 0.15% to about 0.35%, about 0.15% to about 0.3%, about 0.15% to about 0.25%, 0.2% to about 0.4%, about 0.2% to about 0.35%, about 0.2% to about 0.3%, or about 0.2% to about 0.25%.

Chemical blowing agents are materials that degrade or react to produce a gas. Chemical blowing agents may be endothermic or exothermic. Chemical blowing agents typically degrade at a certain temperature to decompose and release gas. In one aspect the chemical blowing agent may be one or more materials selected from the group consisting of azodicarbonamide, azodiisobutyro-nitrile, benzenesulfonyl hydrazide, 4,4-oxybenzene sulfonylsemicarbazide, p-toluene sulfonyl semi-carbazide, barium azodicarboxylate, N,N'-dimethyl-N,N'-dinitrosoterephthalamide, trihydrazino triazine, sodium bicarbonate, sodium carbonate, ammonium bicarbonate, ammonium carbonate, ammonium nitrite, N,N'-dinitrosopentamethylene tetramine, azobisisobutylonitrile, azocyclohexylnitrile, azodiaminobenzene, toluene sulfonyl hydrazide, p,p'-oxybis(benzene sulfonyl hydrazide), diphenyl sulfone-3,3'-disulfonyl hydrazide, calcium azide, 4,4'-diphenyl disulfonyl azide, and p-toluene sulfonyl azide. In some embodiments, the chemical blowing agent is Hydrocerol™ CF®-40E available from Clariant. In some embodiments, the chemical blowing agent is Ecocell® P available from the Polyfil Corporation.

The amount of a chemical blowing agent may be one of several different values or fall within one of several different ranges. It is within the scope of the present disclosure to select an amount of a chemical blowing agent to be one of the following values: about 0%, about 0.1%, about 0.2%, about 0.3%, about 0.4%, about 0.5%, about 0.75%, about 1%, about 1.5%, or about 2% of the total formulation of the polymeric layer by weight percentage. It is within the scope of the present disclosure for the amount of a chemical blowing agent in the formulation to fall within one of many different ranges. In a first set of ranges, the range of a chemical blowing agent is one of the following ranges: about 0% to about 5%, about 0.1% to about 5%, about 0.25% to about 5%, about 0.5% to about 5%, about 0.75% to about 5%, about 1% to about 5%, about 1.5% to about 5%, about 2% to about 5%, about 3% to about 5%, and about 4% to about 5% of the total formulation of the polymeric layer by weight percentage. In a second set of ranges, the range of a chemical blowing agent is one of the following ranges: about 0.1% to about 4%, about 0.1% to about 3%, about 0.1% to about 2%, and about 0.1% to about 1% of the total formulation by weight percentage. In a third set of ranges, the range of a chemical blowing agent is one of the following ranges: about 0.25% to about 4%, about 0.75% to about 4%, about 1% to about 4%, about 1.5% to about 4%, about 2% to about 4%, about 3% to about 4%, about 0% to about 3%, about 0.25% to about 3%, about 0.5% to about 3%, about 0.75% to about 3%, about 1% to about 3%, about 1.5%, to about 3%, about 2% to about 3%, about 0% to about 2%, about 0.25% to about 2%, about 0.5%, to about 2%, about 0.75% to about 2%, about 1% to about 2%, about 1.5% to about 2%, about 0% to about 1%, about 0.5% to about 1%, and about 0.75% to about 1% of the total formulation of the polymeric layer by weight percentage. In one aspect of the present disclosure, where a chemical blowing agent is used, the chemical blowing agent may be introduced into the material formulation that is added to the hopper.

In one aspect of the present disclosure, where a chemical blowing agent is used, the chemical blowing agent may be introduced into the resin formulation that is added to the hopper.

In one aspect of the present disclosure, the chemical blowing agent may be a decomposable material that forms a gas upon decomposition. A representative example of such a material is citric acid or a citric-acid based material. In one exemplary aspect of the present disclosure, it may be possible to use a mixture of physical and chemical blowing agents.

In one aspect of the present disclosure, at least one slip agent may be incorporated into the resin mixture to aid in increasing production rates. Slip agent (also known as a process aid) is a term used to describe a general class of materials, which are added to a resin mixture and provide surface lubrication to the polymer during and after conversion. Slip agents may also reduce or eliminate die drool.

Representative examples of slip agent materials include amides of fats or fatty acids, such as, but not limited to, erucamide and oleamide. In one exemplary aspect, amides from oleyl (single unsaturated $C_{18}$) through erucyl ($C_{22}$ single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a slip agent that is commercially available as AMPACET™ 102109 Slip PE MB. Another example of a slip agent that is commercially available is AMAPACET™ 102823 Process Aid PE MB. In some embodiments, the insulative cellular non-aromatic polymeric material lacks a process aid.

The amount of a slip agent may be one of several different values or fall within one of several different ranges. It is within the scope of the present disclosure to select an amount of a slip agent to be one of the following values: about 0%, about 0.5%, 1%, about 2%, about 3%, about 4%, about 5%, about 6%, about 7%, about 8%, about 9%, or about 10% of the total formulation of the polymeric layer by weight percentage. It is within the scope of the present disclosure for the amount of a slip agent in the formulation to fall within one of many different ranges. In a first set of ranges, the range of a slip agent is one of the following ranges: about 0% to about 10% (w/w), about 0.5% to about 10%, about 1% to about 10%, about 2% to about 10%, about 3% to about 10%, about 4% to about 10%, about 5% to about 10%, about 6% to about 10%, about 7% to about 10%, about 8% to about 10%, and about 9% to about 10% of the total formulation of the polymeric layer by weight percentage. In a second set of ranges, the range of a slip agent is one of the following ranges: about 0% to about 9%, about 0% to about 8%, about 0% to about 7%, about 0% to about 6%, about 0% to about 5%, about 0% to about 4%, about 0% to about 3%, about 0% to about 2%, about 0% to about 1%, and about 0% to about 0.5% of the total formulation of the polymeric layer by weight percentage. In a third set of ranges, the range of a slip agent is one of the following ranges: about 0.5% to about 5%, about 0.5% to about 4%, about 0.5% to about 3%, about 0.5%, to about 2%, about 1% to about 2%, about 1% to about 3%, about 1% to about 4%, about 1% to about 5%, about 2% to about 3%, about 2% to about 4%, and about 2% to about 5% of the total formulation by weight percentage. In an embodiment, the formulation lacks a slip agent.

One or more additional components and additives optionally may be incorporated, such as, but not limited to, impact modifiers, colorants (such as, but not limited to, titanium dioxide), and compound regrind. One example of a commercially available colorant is COLORTECH® blue-white colorant. Another example of a commercially available colorant is COLORTECH® J11 white colorant.

The amount of a colorant may be one of several different values or fall within one of several different ranges. It is within the scope of the present disclosure to select an amount of a colorant to be one of the following values: about 0%, about 0.1%, about 0.5%, about 0.6%, about 0.7%, about 0.8%, about 0.9%, about 1%, about 1.5%, about 2%, about 3%, about 4%, about 5%, about 6%, about 7%, about 8%, about 9%, 1 about 0%, about 15%, or about 20% of the total formulation of the polymeric layer by weight percentage. It is within the scope of the present disclosure for the amount of a colorant in the formulation to fall within one of many different ranges. In a first set of ranges, the range of a colorant is one of the following ranges: about 0% to about 20% (w/w), about 0% to about 10%, about 0% to about 5%, and about 0% to about 4%. In a second set of ranges, the range of a colorant is one of the following ranges: about 0.1% to about 4%, about 0.25% to about 4%, about 0.5% to about 4%, about 0.75% to about 4%, about 1% to about 4%, about 1.5% to about 4%, about 2% to about 4%, about 2.5% to about 4%, and about 3% to about 4% of the total formulation of the polymeric layer by weight percentage. In a third set of ranges, the range of a colorant is one of the following ranges: about 0% to about 3%, about 0% to about 2.5%, about 0% to about 2.25%, about 0% to about 2%, about 0% to about 1.5%, about 0% to about 1%, about 0% to about 0.5%, about 0.1% to about 3.5%, about 0.1% to about 3%, about 0.1% to about 2.5%, about 0.1% to about 2%, about 0.1% to about 1.5%, about 0.1% to about 1%, about 1% to about 5%, about 1% to about 10%, about 1% to about 15%, about 1% to about 20%, and about 0.1% to about 0.5% of the total formulation by weight percentage. In an embodiment, the formulation lacks a colorant.

In some embodiments, the polymeric formulation comprises regrind. Regrind may be formed by recovering the excess material, sometimes called a blank-carrier sheet 94, produced during a blank forming step 150, as shown in FIG. 1. Regrind can be processed during a regrinding step 190 that grinds blank-carrier sheet 94 into pellets 97. In some embodiments, pellets 97 can be melted and re-pelletized prior to being added to a polymeric formulation.

In some embodiments, regrind comprises ink. In some embodiments, the ink is from ink layer 66. In some embodiments, regrind is substantially free of ink. In some embodiments, the regrind comprises polypropylene, polyethylene, a physical nucleating agent, a slip agent, or a combination thereof. Illustratively, regrind is substantially free of an adhesive. In some embodiments, regrind is substantially free of an epoxy. In some embodiments, regrind comprises polypropylene, polyethylene, and bi-axially oriented polypropylene (BOPP).

As described above, in some embodiments, regrind is substantially free of an adhesive. Illustratively, adhesives may present issues when included in regrind used in materials that contact food products. Illustrative adhesives include epoxies, urethanes, acrylates, maleimides or any suitable alternative. In some embodiments, regrind substantially free of an adhesive may be reincorporated back into insulative cellular non-aromatic polymeric material 82. Accordingly, the process as suggested in FIG. 1 can couple printed film layer 56 to insulative cellular non-aromatic polymeric material 82 without using such an adhesive.

It was also surprisingly found that including regrind into the formulation for insulative cellular non-aromatic polymeric material 82 had minimal negative effects on performance. As shown below in the Examples, regrind has lower melt strength that virgin resin. In particular, regrind had an average load at break of less than about 0.1 N. In some embodiments, the average load at break of the regrind may be less than 0.3 N, less than about 0.2 N, or less than about 0.1 N. In contrast, the tested virgin materials had an average load at break of at least 0.4 N. In some embodiments, the virgin materials may have an average load at break of at least 0.35 N, at least about 0.4 N, or at least about 0.45 N. Illustratively, a ratio of the average load at break for the virgin material compared to the regrind may be at about 1:1, about 2:1, about 3:1, about 4:1, or about 5:1. Accordingly, maintaining the properties of the foam when substituting regrind for virgin resin allows for improved efficiency and minimizes waste.

In some embodiments, regrind comprises ink. In some embodiments, the ink is from ink layer 66. In some embodiments, regrind is substantially free of ink. In some embodiments, the regrind comprise polypropylene, polyethylene, a physical nucleating agent, a slip agent, or a combination thereof. Illustratively, regrind is substantially free of an adhesive. In some embodiments, regrind is substantially free of an epoxy. In some embodiments, regrind comprises polypropylene, polyethylene, and BOPP.

In some embodiments, the polymeric formulation comprises regrind. It is within the scope of the present disclosure to select an amount of regrind to be up to about 5%, up to about 10%, up to about 15%, up to about 20%, up to about 25%, up to about 30%, up to about 35%, up to about 40%, up to about 45%, up to about 50%, up to about 55%, up to about 60%, up to about 65%, up to about 75%, up to about 85%, or up to about 95% by weight of the polymeric formulation. The percentage by weight of regrind in the polymeric formulation may be about 0%, about 0.5%, about 1%, about 3%, about 4%, about 5%, about 7%, about 10%, about 15%, about 20%, about 25%, about 30%, about 35%, about 40%, about 45%, about 50%, about 55%, about 60%, about 65%, about 70%, about 755, about 80%, about 85%, about 90%, or about 95% by weight of the polymeric formulation. In a first set of ranges, the range of a regrind in the polymeric formulation is one of the following ranges: about 0.5% to about 95%, about 3% to about 95%, about 5% to about 95%, about 10% to about 95%, about 15% to about 95%, about 20% to about 95%, about 25% to about 95%, about 30% to about 40% to about 95%, about 50% to about 95%, about 60% to about 95%, about 75% to about 95%, or about 85% to about 95% by weight of the polymeric formulation. In a second set of ranges, the range of regrind in the polymeric formulation is one of the following ranges: about 0.5% to about 90%, about 0.5% to about 85%, about 0.5% to about 75%, about 0.5% to about 60%, about 0.5% to about 50%, about 0.5% to about 45%, about 0.5% to about 40%, about 0.5% to about 35%, about 0.5% to about 30%, about 0.5% to about 25%, about 0.5% to about 20%, about 0.5% to about 15%, or about 0.5% to about 10% by weight of the polymeric formulation. In a third set of ranges, the range of regrind in the polymeric formulation is one of the following ranges: about 1% to about 90%, about 1% to about 85%, about 1% to about 75%, about 1% to about 50%, about 3% to about 50%, about 3% to about 45%, about 5% to about 45%, about 5% to about 40%, about 5% to about 35%, about 10% to about 40%, about 10% to about 35%, about 10% to about 45%, about 20% to about 45%, about 5% to about 40%, about 5% to about 30%, about 15% to about 30%, or about 30% to about 40% by weight of the polymeric formulation.

As described herein, a polymeric formulation, sometimes illustrated as polymeric formulation as in FIG. 1, is added to extruder hopper 113 as shown in FIG. 1. The formulation is heated as it passes through first extrusion zone to become a molten resin that becomes an extrusion mixture. Extrusion mixture passes along machine direction 67 through the second extrusion zone and exits as an extrudate 124. Illustratively, extrudate 124 is slit by a slitter to form an insulative cellular non-aromatic polymeric material strip 82. In some embodiments, a physical blowing agent is introduced through a physical blowing agent port in the first extrusion zone.

The insulative cellular non-aromatic polymeric material that forms insulative cellular non-aromatic polymeric material strip 82 has a density that is generally lower than a non-foamed equivalent material. It is within the scope of the present disclosure that the density of the extruded insulative cellular non-aromatic material be up to about 0.25 g/cm$^3$, up to about 0.2 g/cm$^3$, up to about 0.18 g/cm$^3$, up to about 0.16 g/cm$^3$, up to about 0.14 g/cm$^3$, up to about 0.13 g/cm$^3$, or up to about 0.12 g/cm$^3$. In some embodiments, the density of the polymeric material is less than about 0.2 g/cm$^3$, less than about 0.18 g/cm$^3$, less than about 0.16 g/cm$^3$, less than about 0.15 g/cm$^3$, less than about 0.14 g/cm$^3$, or less than about 0.13 g/cm$^3$. The density of the insulative-cellular non-aromatic polymeric material may be about 0.01 g/cm$^3$, about 0.03 g/cm$^3$, about 0.05 g/cm$^3$, about 0.06 g/cm$^3$, about 0.07 g/cm$^3$, about 0.08 g/cm$^3$, about 0.09 g/cm$^3$, about 0.1 g/cm$^3$, about 0.11 g/cm$^3$, about 0.12 g/cm$^3$, about 0.13 g/cm$^3$, about 0.14 g/cm$^3$, about 0.15 g/cm$^3$, about 0.16 g/cm$^3$, about 0.18 g/cm$^3$, about 0.2 g/cm$^3$, or about 0.25 g/cm$^3$. In a first set of ranges, the density of the insulative cellular non-aromatic polymeric material is one of the following ranges: about 0.01 g/cm$^3$ to about 0.2 g/cm$^3$, about 0.05 g/cm$^3$ to about 0.25 g/cm$^3$, about 0.05 g/cm$^3$ to about 0.2 g/cm$^3$, about 0.05 g/cm$^3$ to about 0.19 g/cm$^3$, about 0.07 g/cm$^3$ to about 0.2 g/cm$^3$, about 0.08 g/cm$^3$ to about 0.2 g/cm$^3$, about 0.09 g/cm$^3$ to about 0.2 g/cm$^3$, about 0.1 g/cm$^3$ to about 0.2 g/cm$^3$, about 0.11 g/cm$^3$ to about 0.2 g/cm$^3$, or about 0.12 g/cm$^3$ to about 0.2 g/cm$^3$. In a second set of ranges, the density of the insulative cellular non-aromatic polymeric material is one of the following ranges: about 0.06 g/cm$^3$ to about 0.25 g/cm$^3$, about 0.06 g/cm$^3$ to about 0.2 g/cm$^3$, about 0.06 g/cm$^3$ to about 0.18 g/cm$^3$, about 0.06 g/cm$^3$ to about 0.16 g/cm$^3$, about 0.06 g/cm$^3$ to about 0.14 g/cm$^3$, or about 0.06 g/cm$^3$ to about 0.12 g/cm$^3$. In a third set of ranges, the density of the insulative cellular non-aromatic polymeric material is one of the following ranges: about 0.05 g/cm$^3$ to about 0.2 g/cm$^3$, about 0.05 g/cm$^3$ to about 0.15 g/cm$^3$, about 0.07 g/cm$^3$ to about 0.15 g/cm$^3$, about 0.09 g/cm$^3$ to about 0.15 g/cm$^3$, about 0.11 g/cm$^3$ to about 0.15 g/cm$^3$, about 0.08 g/cm$^3$ to about 0.2 g/cm$^3$, about 0.08 g/cm$^3$ to about 0.18 g/cm$^3$, about 0.08 g/cm$^3$ to about 0.16 g/cm$^3$, about 0.08 g/cm$^3$ to about 0.14 g/cm$^3$, about 0.09 g/cm$^3$ to about 0.14 g/cm$^3$, about 0.09 g/cm$^3$ to about 0.13 g/cm$^3$, about 0.1 g/cm$^3$ to about 0.14 g/cm$^3$, or about 0.1 g/cm$^3$ to about 0.12 g/cm$^3$.

The insulative cellular non-aromatic polymeric material that forms insulative cellular non-aromatic polymeric material strip 82 has a thickness that is generally greater than a non-foamed equivalent material. It is within the scope of the present disclosure that the thickness of the extruded insulative cellular non-aromatic material be less than about 0.1 inches, less than about 0.08 inches, less than about 0.07 inches, or less than about 0.06 inches. In some embodiments, the thickness of the insulative cellular non-aromatic polymeric material is at least 0.01 inches, at least 0.03 inches or higher, or at least 0.04 inches.

Illustratively, the insulative cellular non-aromatic polymeric material is a polymeric material comprising cells. In illustrative embodiments, the cell morphology of an extruded sheet of insulative cellular polypropylene-based material in accordance with the present disclosure is a function of formulation and process conditions, which conditions have an effect on the quality of an article, such as an insulative container, formed therewith. In particular, the effects of such conditions on cell density and cell dimensional attributes, and ultimately on crease/wrinkle resistance, results in a wrinkle-resistance prediction model based on power law regression.

In illustrative embodiments, the cell aspect ratio of an extruded sheet of insulative cellular polypropylene-based material in accordance with the present disclosure has an effect on the wrinkle resistance of that material during mechanical convolution. Parameters such as cell density and aspect ratio contribute to the control limits that result in a wrinkle-resistance model for the extruded sheet.

Direct evidence of polymer cell structure is provided by microscopy studies. There is a close relationship between the regularity of molecular structure and malleability. Cell morphology describes polymer cell density, cell structure, cell wall thickness, cell shape, and cell size distribution of cells. Polymer cell structures may have the same general shape and appearance, being composed predominantly of oval cells, and the same log normal cell distribution, but possess a different cell aspect ratio and cell wall thickness. Illustratively, cell aspect ratio is the ratio between lengths of the ovular polymer cells to widths of the ovular polymer cells. In some embodiments, the cell aspect ratio of the insulative cellular non-aromatic polymeric material is at least 0.5, at least 1, at least 1.1, at least 1.2, at least 1.5, at least 1.7, or at least 2. In some embodiments, the cell aspect ratio of the cells of the insulative cellular non-aromatic polymeric material is less than 7, less than 6, less than 4, less than 3.5, less than 3, less than 2.5, or less than 2. In some embodiments, the aspect ratio of the cells of the insulative cellular non-aromatic polymeric material is selected from a range of 0.5 to about 4, about 1 to about 4, about 1 to about 3.5, about 1 to about 3, or about 1 to about 2.

Illustratively, the polymer cells can have a cell aspect ratio in the machine direction (MD) and in the cross direction (CD). As confirmed by microscopy, in one exemplary embodiment the average cell dimensions in a machine direction 67 (machine or along the web direction) of an extruded strip 82 of insulative cellular non-aromatic polymeric material were about 0.0362 inches (0.92 mm) in width by about 0.0106 inches (0.27 mm) in height. As a result, a machine direction cell size aspect ratio is about 3.5. The average cell dimensions in a cross direction (cross-web or transverse direction) was about 0.0205 inches (0.52 mm) in width and about 0.0106 inches (0.27 mm) in height. As a result, a cross-direction aspect ratio is 1.94. In one exemplary embodiment, it was found that for the strip to withstand a compressive force during cup forming, one desirable average cell aspect ratio was between about 1.0 and about 3.0. In one exemplary embodiment, one desirable average cell aspect ratio was between about 1.0 and about 2.0. In another exemplary embodiment, a desirable average cell aspect ratio in the cross direction was about 0.5 to about 4. In another exemplary embodiment, a desirable average cell aspect ratio in the machine direction was about 1 to about 7.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 1.5 and about 3. In one exemplary embodiment, the coefficient of anisotropy was about 1.8.

If the circumference of the cup is aligned with machine direction 67 of extruded strip 82 with a cell aspect ratio exceeding about 3.0, deep creases with a depth exceeding about 200 microns are typically formed on inside surface of the cup making it unusable. Unexpectedly, it was found, in one exemplary embodiment, that if the circumference of the cup was aligned in the cross direction of extruded strip 82, which can be characterized by cell aspect ratio below about 2.0, no deep creases were formed inside of the cup, indicating that the cross direction of extruded strip 82 was more resistant to compression forces during cup formation.

One possible reason for greater compressibility of an extruded strip with cells having aspect ratio below about 2.0 in the direction of cup circumference, such as in the cross direction, could be due to lower stress concentration for cells with a larger radius. Another possible reason may be that the higher aspect ratio of cells might mean a higher slenderness ratio of the cell wall, which is inversely proportional to buckling strength. Folding of the strip into wrinkles in the compression mode could be approximated as buckling of cell walls. For cell walls with a longer length, the slenderness ratio (length to diameter) may be higher. Yet another possible factor in relieving compression stress might be a more favorable polymer chain packing in cell walls in the cross direction allowing polymer chain re-arrangements under compression force. Polymer chains are expected to be preferably oriented and more tightly packed in machine direction 67.

The insulative-cellular non-aromatic polymeric materials in accordance with the present disclosure may have a cell density of about $1\times10^5$ to about $2.5\times10^6$ cells/in$^3$.

In exemplary embodiments, alignment of the formed cup circumference along the direction of the extruded strip has a cell aspect ratio below about 2.0. As a result, the surface of extruded strip with crystal domain size below about 100 angstroms facing inside the cup may provide favorable results of achieving a desirable surface topography with imperfections less than about 5 microns deep.

A material-forming process 100 uses a polymeric formulation in accordance with the present disclosure to produce a strip 82 of insulative cellular non-aromatic polymeric material as shown in FIG. 6. The polymeric formulation is heated and extruded in two stages in an extruder 111 to produce a tubular extrudate 124 that can be slit to provide strip 82 of insulative cellular non-aromatic polymeric material as illustrated, for example, in FIG. 6. A blowing agent in the form of a liquefied inert gas may be introduced into a molten resin in extruder 111.

Material-forming process 100 includes an extruding stage 110, a laminating stage 130, a blank forming stage 150, a cup forming stage 170, and a regrinding stage 190, as shown in FIG. 6. Extruding stage 110 forms and provides a strip 82 of insulative cellular non-aromatic polymeric material. Laminating stage laminates the formed insulative cellular non-aromatic polymeric material with printed film 70 to form multi-layer sheet 80. Blank forming stage 150 cuts sheet 80 to form body blank 92 and blank-carrier sheet 94. Body blank 92 may then proceed to cup forming stage 170 to form insulated cup 10. Blank-carrier sheet 94 may proceed to regrinding stage 190 so that it can be reprocessed and reintroduced into the polymeric formulation as regrind pellets 97.

Cup forming stage 170 forms cup 10 from body blank 92, as shown in FIG. 8. In some embodiments, cup forming stage 170 includes a body blank annealing step 172, a cup-base forming step 173, a brim forming step 174, and a cup packing step 175. Body blank annealing step 172 heats body blank 92 so that stresses in the non-aromatic polymer structure of multi-layer sheet 80 are released to reduce creasing and wrinkling in the surfaces of body blank 92. Cup-base forming step 173 introduces floor 20 to body blank 92 to form floor 20 and side wall 18. Brim forming step 174 rolls a top portion of side wall 18 down to form rolled brim 16 and form cup 10. Cups 10 can then be packaged during cup packaging step 175.

The formulation and insulative cellular non-aromatic polymeric material of the present disclosure satisfies a long-felt need for a material that can be formed into an article, such as a cup, that includes many if not all of the features of insulative performance, ready for recyclability, puncture resistance, frangibility resistance, microwavability and other features as discussed herein. Others have failed to provide a material that achieves combinations of these features as reflected in the appended claims. This failure is a result of the features being associated with competitive design choices. As an example, others have created materials and structures therefrom that based on design choices are insulated but suffer from poor puncture resistance, inability to effectively be recyclable, and lack microwavability. In comparison, the formulations and materials disclosed herein overcome the failures of others by using an insulative cellular non-aromatic polymeric material. Reference is hereby made to U.S. application Ser. No. 13/491,007 filed Jun. 7, 2012, and entitled INSULATED CONTAINER for disclosure relating to articles, such as cups, formed from such insulative cellular non-aromatic polymeric materials, which application is hereby incorporated in its entirety herein. Reference is hereby made to U.S. application Ser. No. 14/462,073 filed Aug. 18, 2014, and entitled POLYMERIC MATERIAL FOR AN INSULATED CONTAINER for disclosure relating to insulative cellular non-aromatic polymeric materials, which application is hereby incorporated in its entirety herein.

An insulative cup 10 in accordance with the present disclosure can be formed during a cup forming process. Localized plastic deformation is provided in accordance with the present disclosure in, for example, four regions of a body 11 of insulative cup 10 comprising an insulative cellular non-aromatic polymeric material as suggested in FIGS. 1, 4, and 5A-D. A material has been plastically deformed, for example, when it has changed shape to take on a permanent set in response to exposure to an external compression load and remains in that new shape after the load has been removed. Insulative cup 10 disclosed herein is not a paper cup but rather a cup made of a cellular non-aromatic polymeric material with insulative qualities suitable for holding hot and cold contents.

Aromatic molecules typically display enhanced hydrophobicity when compared to non-aromatic molecules. As a result, it would be expected that changing from a polystyrene-based insulative cellular polymeric material to a polypropylene-based insulative cellular polymeric material would result in a change in hydrophobicity with a concomitant, but not necessarily predictable or desirable, change in surface adsorption properties of the resulting material. In addition, by virtue of the hydrocarbon chain in polystyrene, wherein alternating carbon centers are attached to phenyl groups, neighboring phenyl groups can engage in so-called pi-stacking, which is a mechanism contributing to the high intramolecular strength of polystyrene and other aromatic polymers. No similar mechanism is available for non-aromatic polymers such as polypropylene. Moreover, notwithstanding similar chemical reactivity and chemical resistance properties of polystyrene and polypropylene, polystyrene can be either thermosetting or thermoplastic when manufactured whereas polypropylene is exclusively thermoplastic. As a result, to the extent that surface adsorption properties, manufacturing options, and strength properties similar to those of polystyrene are sought, likely alternatives to polystyrene-based insulative cellular polymeric materials would be found in another aromatic polymer rather than in a non-aromatic polymer.

In illustrative embodiments, the insulative cellular non-aromatic polymeric material is used as a substrate in a composite sheet that includes a film laminated to the insulative cellular non-aromatic polymeric material. The film is reverse printed before being laminated to the substrate so that the printing is visible through the film, with the film forming a protective cover over the printing. In some embodiments, the film is not reverse printed.

In illustrative embodiments, the insulative cellular non-aromatic polymeric material may include one or more polypropylene materials as a base material. The laminated film is also polypropylene so that the entire cup may be ground up and re-used in the same process.

In one illustrative aspect, an exemplary polypropylene-based insulative cellular non-aromatic polymeric material formed as an insulative cellular non-aromatic polymeric material sheet may have a thickness ranging from about 60 mils to about 80 mils. In another illustrative aspect, an exemplary polypropylene-based insulative cellular non-aromatic polymeric material formed as an insulative cellular non-aromatic polymeric material sheet may have a density ranging from about 0.05 g/cm$^3$ to about 0.20 g/cm$^3$. The insulative cellular non-aromatic polymeric material is used in cup-manufacturing process 100 to produce insulative cup 10 having a region of localized plastic deformation. The region of localized plastic deformation may be the result of compressing the insulative cellular non-aromatic polymeric material. The region of localized plastic deformation has a first density in a range of about 0.3 g/cm$^3$ to about 0.4 g/cm$^3$. The insulative cellular non-aromatic polymeric material surrounding the region of localized plastic deformation is uncompressed and has a second density in a range of about 0.05 g/cm$^3$ to about 0.20 g/cm$^3$.

In another illustrative aspect, an exemplary polypropylene-based insulative cellular non-aromatic polymeric material formed as a strip of insulative cellular non-aromatic polymeric material may have a tensile strength in the machine direction and cross direction ranging from about 4.0 MPa to about 7.0 MPa and from about 3.0 MPa to about 6.0 MPa, respectively. In another illustrative aspect, an exemplary polypropylene-based insulative cellular non-aromatic polymeric material formed as a strip of insulative cellular non-aromatic polymeric material may have an elastic modulus in the machine direction and cross direction ranging from about 160 MPa to about 240 MPa and from about 120 MPa to about 170 MPa, respectively.

In another illustrative aspect, an exemplary insulative cellular non-aromatic polymeric material formed as a strip of insulative cellular non-aromatic polymer material may have cells in the shape of oriented, stretched ovals. In another illustrative aspect, an exemplary polypropylene-based insulative cellular non-aromatic polymeric material formed as a strip of insulative cellular non-aromatic polymeric material may average cell dimensions in machine direction of about 0.0362 inches (0.92 mm) in width by 0.0106 inches (0.27 mm) in height, resulting in a machine direction cell size aspect ratio of about 3.5. The average cell dimensions in cross direction or transverse to machine direction 67 are about 0.0204 inches (0.52 mm) in width and about 0.0106 inches (0.27 mm) in height, resulting in a cross direction cell size aspect ratio of 1.94. As a result, the aspect ratio of foam cells is between about 1.0 and 3.0. In another example, the aspect ratio of foam cells is between about 1.0 and about 2.0.

Another potential feature of an insulative cup formed of insulative cellular non-aromatic polymeric material according to the present disclosure is that the cup can be placed in and go through a conventional residential or commercial dishwasher cleaning cycle (top rack) without noticeable structural or material breakdown or adverse effect on material properties. This is in comparison to beaded expanded polystyrene cups or containers, which can break down under similar cleaning processes. Accordingly, a cup made according to one aspect of the present disclosure can be cleaned and reused.

Another potential feature of an insulative cup formed of insulative cellular non-aromatic polymeric material according to various aspects of the present disclosure is that the insulative cup and scrap material can be recycled. Recyclable means that a material can be added (such as regrind) back into an extrusion or other formation processes without segregation of components of the material. As an example, an insulative cup formed the insulative cellular non-aromatic polymeric material does not have to be manipulated to remove one or more materials or components prior to re-entering the extrusion process.

In another example, an insulative cup formed from a sheet including a printed film skin laminated to an exterior of an insulative cellular non-aromatic polymeric material may be recyclable if one does not need to separate out the film layer prior to the insulative cup being ground into particles. In contrast, a paper-wrapped expanded polystyrene cup may not be recyclable because the polystyrene material could not practicably be used as material in forming an expanded polystyrene cup, even though the cup material may possibly be formed into another product.

As a further example, an insulative cup formed from a non-expanded polystyrene material having a layer of printed film adhered thereto may be considered non-recyclable because it would require the segregation of the film layer, which would not be desirable to introduce as part of the regrind into the extrusion process. Recyclability of articles formed using the insulative cellular non-aromatic polymeric material of the present disclosure minimizes the amount of disposable waste created. In comparison, beaded expanded polystyrene cups that break up into beads and thus ordinarily cannot be reused easily in a manufacturing process with the same material from which the article was formed. In addition, paper cups that typically have an extrusion coated plastic layer or a plastic lamination for liquid resistance ordinarily cannot be recycled because the different materials (paper, adhesive, film, and plastic) normally cannot be practicably separated in commercial recycling operations.

A potential feature of an insulative cup formed of insulative cellular non-aromatic polymeric material according to one aspect (a non-laminate process) of the present disclosure is that the outside (or inside or both) wall surface of the insulative cellular polypropylene sheet (prior to being formed into an insulative cup, or during cup formation, depending on the manufacturing process employed) can accept printing of high-resolution graphics. In contrast, beaded expanded polystyrene cups have a surface which typically is not smooth enough to accept printing other than low-resolution graphics. Like beaded expanded polystyrene cups, uncoated paper cups also typically do not have a smooth enough surface for such high-resolution graphics. Paper cups have difficulty reaching insulation levels and require a designed air gap incorporated into or associated with the paper cup to achieve insulation. Such designed air gap may be provided by a sleeve slid onto and over a portion of the paper cup.

In some embodiments, the polymeric material, a laminated sheet comprising the polymeric material, or a cup formed of the laminated sheet has a puncture resistance, as measured in inches for either a ¼" probe or a ⅛" probe. In some embodiments, the puncture resistance for the polymeric material, the laminated sheet, or the cup (elongation at peak load) is at least about 0.2 inches. In some embodiments, the puncture resistance for the polymeric material, the laminated sheet, or the cup (elongation at peak load) is less than about 0.75 inches.

In some embodiments, the polymeric material, a laminated material comprising the polymeric material, or the cup formed of the laminated material were tested using the Elmendorf test method described in ASTM D1922-93. In some embodiments, the Elmendorf Arm MD for the polymeric material is at least about 500 g. In some embodiments, the Elmendorf Arm MD for the laminated material is at least about 1500 g. In some embodiments, the Elmendorf Arm MD for the cup is at least about 1500 g. In some embodiments, the Elmendorf Arm TD for the polymeric material is at least about 500 g. In some embodiments, the Elmendorf Arm TD for the laminated material is at least about 1500 g. In some embodiments, the Elmendorf Arm TD for the cup is at least about 1500 g.

It is within the scope of the present disclosure that the density of the multi-layer sheet be up to about 0.25 $g/cm^3$, up to about 0.2 $g/cm^3$, up to about 0.18 $g/cm^3$, up to about 0.16 $g/cm^3$, up to about 0.14 $g/cm^3$, up to about 0.13 $g/cm^3$, or up to about 0.12 $g/cm^3$. In some embodiments, the density of the multi-layer sheet is less than about 0.2 $g/cm^3$, less than about 0.18 $g/cm^3$, less than about 0.16 $g/cm^3$, less than about 0.15 $g/cm^3$, less than about 0.14 $g/cm^3$, or less than about 0.13 $g/cm^3$. The density of the multi-layer sheet may be about 0.01 $g/cm^3$, about 0.03 $g/cm^3$, about 0.05 $g/cm^3$, about 0.06 $g/cm^3$, about 0.07 $g/cm^3$, about 0.08 $g/cm^3$, about 0.09 $g/cm^3$, about 0.1 $g/cm^3$, about 0.11 $g/cm^3$, about 0.12 $g/cm^3$, about 0.13 $g/cm^3$, about 0.14 $g/cm^3$, about 0.15 $g/cm^3$, about 0.16 $g/cm^3$, about 0.18 $g/cm^3$, about 0.2 $g/cm^3$, or about 0.25 $g/cm^3$. In a set of ranges, the density of the multi-layer sheet is one of the following ranges: about 0.01 $g/cm^3$ to about 0.2 $g/cm^3$, about 0.05 $g/cm^3$ to about 0.19 $g/cm^3$, about 0.05 $g/cm^3$ to about 0.18 $g/cm^3$, about 0.05 $g/cm^3$ to about 0.17 $g/cm^3$, about 0.1 $g/cm^3$ to about 0.17 $g/cm^3$, about 0.11 $g/cm^3$ to about 0.17 $g/cm^3$, or about 0.12 $g/cm^3$ to about 0.16 $g/cm^3$.

In some embodiments, cup 10 formed of multi-layer sheet 80 was tested using the Elmendorf test method described in ASTM D1922-93. In some embodiments, the Elmendorf Tear MD for the polymeric material is at least about 75 gf. In some embodiments, the Elmendorf Tear MD for the polymeric material is less than about 350 gf. In some embodiments, the Elmendorf Tear MD for the laminated material is at least about 65 gf. In some embodiments, the Elmendorf Tear MD for the laminated material is less than about 700 gf. In some embodiments, the Elmendorf Tear MD for cup 10 is at least about 125 gf, at least about 200 gf, at least about 300 gf, or at least about 400 gf. In some embodiments, the Elmendorf Tear MD for cup 10 is less than about 700 gf, less than about 600 gf, less than about 500 gf. In some embodiments, the Elmendorf Tear MD for cup 10 is in a range of about 200 gf to about 700 gf, about 300 gf to about 700 gf, about 400 gf to about 700 gf, or about 400 gf to about 600 gf.

In some embodiments, the Elmendorf Tear TD for the polymeric material is at least about 10 gf, at least about 50 gf, or at least about 125 gf. In some embodiments, the Elmendorf Tear TD for the polymeric material is less than about 450 gf. In some embodiments, the Elmendorf Tear TD for the laminated material is at least about 65 gf, at least about 100 gf, or at least about 200 gf. In some embodiments, the Elmendorf Tear TD for the laminated material is less than about 600 gf. In some embodiments, the Elmendorf Tear TD for cup 10 at least about 200 gf, at least about 300 gf, or at least about 400 gf. In some embodiments, the Elmendorf Tear TD for cup 10 is less than about 700 gf or less than about 650 gf. In some embodiments, the Elmendorf Tear TD of cup 10 is about 200 gf to about 700 gf, about 300 gf to about 700 gf, or about 400 gf to about 700 gf.

In some exemplary embodiments, a cup formed from the polymeric material can have a frangibility measurement measured when the cup is either hot or cold. In some embodiments, the cup has a frangibility of at least about 20 lbf when the cup is hot. In some embodiments, the cup has a frangibility less than about 60 lbf when the cup is hot. In some embodiments, the cup has a frangibility of at least about 25 lbf when the cup is cold. In some embodiments, the cup has a frangibility less than about 55 lbf when the cup is cold.

In some embodiments, a cup formed from the polymeric material reaches a temperature when filled with hot liquid. In some embodiments, the hot fill temperature (max side wall) is at least about 130° C. In some embodiments, the hot fill temperature (max side wall) is less than about 170° C. In some embodiments, the hot fill temperature (min internal) is at least about 135° C. In some embodiments, the hot fill temperature (min internal) is less than about 160° C.

In some exemplary embodiments, the polymeric material has a melting crystallinity at 5° C./min, 10° C./min or 15° C./min. In some exemplary embodiments, the melting crystallinity at 5° C./min is at least about 20%. In some exemplary embodiments, the melting crystallinity at 5° C./min is up to about 60%. In some exemplary embodiments, the melting crystallinity at 10° C./min is at least about 10%. In some exemplary embodiments, the melting crystallinity at 10° C./min is up to about 60%. In some exemplary embodiments, the melting crystallinity at 15° C./min is at least about 15%. In some exemplary embodiments, the melting crystallinity at 15° C./min is up to about 65%.

In some embodiments, the polymeric material, a laminated sheet comprising the polymeric material, or a cup formed of the laminated sheet has a puncture resistance, as measured in inches for either a ¼" probe or a ⅛" probe. In some embodiments, the puncture resistance for the polymeric material, the laminated sheet, or the cup (elongation at peak load) is at least about 0.2 inches. In some embodiments, the puncture resistance for the polymeric material, the laminated sheet, or the cup (elongation at peak load) is less than about 0.75 inches.

In some embodiments, cup 10 formed of the multi-layer sheet 80 has a puncture resistance, as measured in max load for either a ¼" probe or a ⅛" probe. In some embodiments, the puncture resistance for cup 10 (max load) is at least about 1,000 gf, at least about 3,000 gf, at least about 6,000 gf, at least about 8,000 gf, at least about 9,000 gf, or at least about 9,500 gf. In some embodiments, the puncture resistance for the cup 10 (max load) is less than about 20,000 gf, less than about 18,000 gf, less than about 12,000 gf, or less than about 10,000 gf. In some embodiments, the puncture resistance for cup 10 (max load) is in a range of about 1,000 gf to about 12,000 gf, about 3,000 gf to about 12,000 gf, about 6,000 gf to about 12,000 gf, about 7,000 gf to about 12,000 gf, about 7,000 gf to about 11,000 gf, about 8,000 gf to about 11,000 gf, about 8,000 gf to about 10,000 gf, or about 9,000 gf to about 10,000 gf.

In some exemplary embodiments, cup 10 has a seam. In some embodiments, the seam thickness is at least about 0.03 inches. In some embodiments, the seam thickness is less than about 1.2 inches.

In some embodiments, cup 10 or the polymeric material has a thermal conductivity at 21° C. In some embodiments, the thermal conductivity at 21° C. is at least about 0.05 W/m-K or at least about 0.052 W/m-K. In some embodiments, the thermal conductivity at 21° C. is less than about 0.057 W/m-K, less than about 0.056 W/m-K, or less than about 0.053 W/m-K. In some embodiments, cup 10 has a thermal conductivity at 21° C. in a range of about 0.05 W/m-K to about 0.06 W/m-K, about 0.05 W/m-K to about 0.059 W/m-K, about 0.052 W/m-K to about 0.059 W/m-K, or about 0.054 W/m-K to about 0.057 W/m-K.

In some embodiments, cup 10 has a thermal conductivity at 93° C. In some embodiments, the thermal conductivity at 93° C. is at least about 0.061 W/m-K or at least about 0.062 W/m-K. In some embodiments, the thermal conductivity at 93° C. is less than about 0.065 W/m-K, less than about 0.064 W/m-K, or less than about 0.0642 W/m-K. In some embodiments, cup 10 has a thermal conductivity at 93° C. in a range of about 0.061 W/m-K to about 0.065 W/m-K, about 0.063 W/m-K to about 0.065 W/m-K, about 0.063 W/m-K to about 0.0645 W/m-K.

In some embodiments, cup 10, when filled with a hot liquid has a time to cool from about 200° F. to about 140° F. In some embodiments, the time to cool is at least 3400 seconds. In some embodiments, the time to cool extended past the allotted measured time.

In some embodiments, cup 10 has a top load measurement. In some embodiments, the top load is at least about 70 lbf, at least about 90 lbf, or at least about 115 lbf. In some embodiments, the top load is less than about 200 lbf, less than about 175 lbf, or less than about 150 lbf. In some embodiments, the top load is in a range of about 70 lbf to about 250 lbf, about 70 lbf to about 200 lbf, about 70 lbf to about 180 lbf, about 70 lbf to about 160 lbf, about 80 lbf to about 160 lbf, about 90 lbf to about 160 lbf, or about 100 lbf to about 160 lbf.

In some embodiments, cup 10 formed of multi-layer sheet 80 has a weight. In some embodiments, the weight of the cup is at least about 9 g, at least about 10 g, or at least about 12 g. In some embodiments, the weight of the cup is less than about 15 g, less than about 14 g, or less than about 12 g. Illustratively, cup 10 may be formed to be a 12 oz. cup, a 14 oz. cup, a 16 oz. cup, an 18 oz. cup, a 20 oz. cup, a 22 oz. cup, a 24 oz. cup, a 26 oz. cup, a 28 oz. cup, or a 30 oz. cup.

In some embodiments, the multi-layer sheet consists of the film layer, the insulative cellular non-aromatic polymeric layer, and the polymeric-lamination layer. In some embodiments, the multi-layer sheet consists of the film layer, the insulative cellular non-aromatic polymeric layer, the polymeric-lamination layer, and an ink layer printed onto the film layer to locate the film layer between the ink layer and the polymeric-lamination layer.

In some embodiments, the polymeric-lamination layer consists of regrind, polypropylene, polyethylene, and a colorant. In some embodiments, the polymeric-lamination layer consists essentially of regrind, polypropylene, and polyethylene.

A potential feature of an insulative cup formed of insulative cellular non-aromatic polymeric material according to the present disclosure is that insulative cup is resistant to puncture, such as by a straw, fork, spoon, fingernail, or the like, as measured by standard impact testing, as described hereinbelow. Test materials demonstrated substantially higher impact resistance when compared to a beaded expanded polystyrene cup. As a result, an insulative cup in accordance with the present disclosure may minimize the likelihood of puncture and leakage of hot liquid.

Insulative cup 10 of the present disclosure satisfies a long-felt need for a vessel that includes many if not all the features of insulative performance, regrindability, ready for recyclability, high-quality graphics, chemical resistance, puncture resistance, frangibility resistance, stain resistance, microwavability, and resistance to leaching undesirable substances into products stored in the interior region of the drink cup as discussed above. Others have failed to provide a vessel that achieves combinations of these features as reflected in the appended claims. This failure is a result of the many features being associated with competitive design choices. As an example, others have created vessels that based on design choices are insulated but suffer from poor puncture resistance, lack of microwavability, and leech undesirable substances into products stored in the interior region. In comparison, insulative cup 10 overcomes the failures of others by using an insulative cellular non-aromatic polymeric material.

Reference is hereby made to U.S. application Ser. No. 13/491,007 filed Jun. 7, 2012, and entitled INSULATED CONTAINER for disclosure relating to insulative containers, which application is hereby incorporated in its entirety herein.

EXAMPLES

The following examples are set forth for purposes of illustration only. Parts and percentages appearing in such examples are by weight unless otherwise stipulated. All ASTM, ISO, and other standard test method cited or referred to in this disclosure are incorporated by reference in their entirety.

Example 1—Formulation and Extrusion

A base resin blend comprised DAPLOY™ WB140 polypropylene homopolymer (available from *Borealis* A/S) and F020HC high crystallinity polypropylene homopolymer, available from Braskem. The base resin blend was blended with: Hydrocerol® CF-40E™ as a chemical blowing agent (CBA), talc as a physical nucleation agent, $CO_2$ as a physical blowing agent, a slip agent, and Ampacet blue-white as a colorant. The colorant can be added to the base resin or to the secondary resin and may be done prior to mixing of the two resins. Percentages were:

| | |
|---|---|
| 86.47% | Borealis WB140 HMS high melt strength homopolymer polypropylene |
| 10% | Braskem F020HC homopolymer polypropylene |
| 0.13% | Clariant Hydrocerol ® CF-40E ™ |
| 0.8% | Heritage Plastics HT4HP Talc |
| 0.8% | AMPACET ™ blue-white |
| 2% | AMPACET ™ 102823 |
| 9.8 lbs/hr | $CO_2$ physical blowing agent introduced into the molten resin |

The formulation was added to an extruder hopper. The extruder heated the formulation to form a molten resin mixture. $CO_2$ was added to the molten resin mixture to expand the resin and reduce density. The formed mixture was extruded through a die head into a strip.

A polymeric-lamination layer comprised Dow 4012 LDPE and ExxonMobil™ 3155 PP3155. The two resins were blended with J11 as the colorant.

Percentages by weight were:

| | |
|---|---|
| 15% | Dow 4012 LDPE |
| 80% | ExxonMobil ™ 3155 PP3155 |
| 5% | J11 colorant |

The formulation was added to an extruder hopper. The extruder heated the formulation to form a molten resin mixture. The molten mixture was between the film (Jindal Films Bicor™ 18 LPX-2) and the insulative cellular non-aromatic polymeric material described above to form the multi-layer sheet. Blanks were cut from the multi-layer sheet and used to form cups in accordance with the present disclosure.

Example 2

Insulative Cellular Non-Aromatic Polymeric Material Properties.

The properties insulative cellular non-aromatic material of Example 1 were evaluated according to procedures known in the art and are shown in Table 1.

TABLE 1

Insulative Cellular Non-Aromatic Polymeric Material Properties

| Property | Sample Size | Average | Standard Deviation |
|---|---|---|---|
| Aspect Ratio (CD) | 50 | 1.86 | 0.6 |
| Aspect Ratio (MD) | 50 | 1.46 | 0.4 |
| Cell Density (cells/in³) | 497 | 742,323 | 132,340 |
| Cell Length (CD) (mils) | 50 | 19.2 | 10.7 |
| Cell Length (MD) (mils) | 50 | 15.5 | 4.7 |
| Cell Width (CD) (mils) | 50 | 10.2 | 3.8 |
| Cell Width (MD) (mils) | 50 | 11.2 | 3.5 |
| Closed Cell % (%) | 497 | 95 | 2.4 |
| Crystallinity 5° C./min (%) | 5 | 33.4% | 2.4% |
| Crystallinity 10° C./min (%) | 5 | 34.9% | 2.6% |
| Crystallinity 15° C./min (%) | 5 | 33.5% | 3.5% |
| Crystallization Temp 5° C./min (° C.) | 5 | 133.9 | 0.2 |
| Crystallization Temp 10° C./min (° C.) | 5 | 129.7 | 0.2 |
| Crystallization Temp 15° C./min (° C.) | 5 | 126.5 | 0.5 |
| Dart Impact (inches) | 5 | 1.54 | 0.1 |
| Density (g/cm³) | 497 | 0.133 | 0.004 |
| Elmendorf Arm MD (g) | 5 | 800 | — |
| Elmendorf Arm TD (g) | 5 | 800 | — |
| Elmendorf Tear MD (gf) | 5 | 162 | 23 |
| Elmendorf Tear TD (gf) | 5 | 191 | 59 |
| Material thickness (inches) | 12 | 0.052 | 0.002 |
| Material thickness (inches) | 12 | 0.064 | 0.002 |
| Melting Crystallinity 5° C./min (%) | 5 | 39% | 3% |
| Melting Crystallinity 10° C./min (%) | 5 | 39% | 3% |
| Melting Crystallinity 15° C./min (%) | 5 | 38% | 4% |

TABLE 1-continued

Insulative Cellular Non-Aromatic Polymeric Material Properties

| Property | Sample Size | Average | Standard Deviation |
|---|---|---|---|
| Puncture Resistance [Elongation at Peak Load] - ¼" probe (inches) | 4 | 0.43 | 0.03 |
| Puncture Resistance [Elongation at Peak Load] - ⅛" probe (inches) | 4 | 0.38 | 0.05 |
| Puncture Resistance [Max Load] - ¼" probe (gf) | 4 | 4835 | 998 |
| Puncture Resistance [Max Load] - ⅛" probe (gf) | 4 | 3189 | 149 |
| Seam thickness (inches) | 4 | 0.060 | 0.003 |
| Seam thickness (inches) | 8 | 0.083 | 0.003 |
| Thermal Conductivity - 21° C. (W/m-K) | 5 | 0.05213 | 0.00006 |
| Thermal Conductivity - 93° C. (W/m-K) | 5 | 0.06297 | 0.00006 |

Example 3

Multi-Layer Sheet Properties.

The properties of the multi-layer sheet formed according to Example 1 are shown below in Table 2.

TABLE 2

Insulative Cellular Non-Aromatic Polymeric Material Properties

| Property | Sample Size | Average | Standard Deviation |
|---|---|---|---|
| Dart Drop (g) |  | 175 | — |
| Elmendorf Arm MD (g) | 5 | 1600 | — |
| Elmendorf Arm TD (g) | 5 | 1600 | — |
| Elmendorf Tear MD Foam Side Top (gf) | 5 | 349 | 93 |
| Elmendorf Tear MD Print Side Top (gf) | 5 | 427 | 33 |
| Elmendorf Tear TD Foam Side Top (gf) | 5 | 419 | 48 |
| Elmendorf Tear TD Print Side Top (gf) | 5 | 285 | 28 |
| Puncture Resistance [Elongation at Peak Load] - Foam Side Front - ¼" probe (inches) | 5 | 0.48 | 0.07 |
| Puncture Resistance [Elongation at Peak Load] - Foam Side Front - ⅛" probe (inches) | 5 | 0.37 | 0.03 |
| Puncture Resistance [Elongation at Peak Load] - Print Side Front - ¼" probe (inches) | 5 | 0.52 | 0.05 |

TABLE 2-continued

Insulative Cellular Non-Aromatic Polymeric Material Properties

| Property | Sample Size | Average | Standard Deviation |
|---|---|---|---|
| Puncture Resistance [Elongation at Peak Load] - Print Side Front - ⅛" probe (inches) | 5 | 0.41 | 0.03 |
| Puncture Resistance [Max Load] - Foam Side Front - ¼" probe (gf) | 5 | 10868 | 1820 |
| Puncture Resistance [Max Load] - Foam Side Front - ⅛" probe (gf) | 5 | 6517 | 184 |
| Puncture Resistance [Max Load] - Print Side Front - ¼" probe (gf) | 5 | 11794 | 631 |
| Puncture Resistance [Max Load] - Print Side Front - ⅛" probe (gf) | 5 | 6662 | 153 |

Example 4

Cup Properties

A cup was formed using the multi-layer sheet of Example 1. The properties for the cup are shown in Table 3.

TABLE 3

Cup Properties

| Property (Unit) | Sample Size | Average | Std. Dev |
|---|---|---|---|
| Elmendorf Arm MD (g) | 5 | 1600 | — |
| Elmendorf Arm TD (g) | 5 | 1600 | — |
| Elmendorf Tear MD Foam Side Top (gf) | 5 | 287 | 45 |
| Elmendorf Tear MD Print Side Top (gf) | 5 | 473 | 64 |
| Elmendorf Tear TD Foam Side Top (gf) | 5 | 406 | 52 |
| Elmendorf Tear TD Print Side Top (gf) | 5 | 411 | 59 |
| Frangibility (max load) (lbf) | 12 | 38.1 | 3.49 |
| Frangibility (max load) (lbf) | 6 | 34.2 | 0.97 |
| Hot fill (max side wall temp) (° F.) | 3 | 148.1 | 2.3 |
| Hot fill (min internal temp) (° F.) | 3 | 147.9 | 0.6 |
| Puncture Resistance [Elongation at Peak Load] - Foam Side Front - ¼" probe (inches) | 4 | 0.50 | 0.03 |
| Puncture Resistance [Elongation at Peak Load] - Foam Side Front - ⅛" probe (inches) | 4 | 0.37 | 0.04 |
| Puncture Resistance [Elongation at Peak Load] - Print Side Front - ¼" probe (inches) | 4 | 0.47 | 0.03 |

TABLE 3-continued

Cup Properties

| Property (Unit) | Sample Size | Average | Std. Dev |
|---|---|---|---|
| Puncture Resistance [Elongation at Peak Load] - Print Side Front - 1/8" probe (inches) | 5 | 0.36 | 0.04 |
| Puncture Resistance [Max Load] - Foam Side Front - 1/4" probe (gf) | 4 | 9970 | 580 |
| Puncture Resistance [Max Load] - Foam Side Front - 1/8" probe (gf) | 4 | 5290 | 230 |
| Puncture Resistance [Max Load] - Print Side Front - 1/4" probe (gf) | 4 | 9770 | 70 |
| Puncture Resistance [Max Load] - Print Side Front - 1/8" probe (gf) | 5 | 5910 | 250 |
| Rigidity (cold fill) lidded filled (kg-F) (30 oz. cup) | 5 | 1.21 | 0.05 |
| Rigidity (cold fill) unlidded filled (kg-F) (30 oz. cup) | 5 | 0.72 | 0.04 |
| Rigidity (hot fill) lidded filled (kg-F) (16 oz. cup) | 5 | 0.53 | 0.01 |
| Rigidity (hot fill) lidded filled (kg-F) (24 oz. cup) | 5 | 0.50 | 0.02 |
| Rigidity (hot fill) unlidded filled (kg-F) (16 oz. cup) | 5 | 0.35 | 0.01 |
| Rigidity (hot fill) unlidded filled (kg-F) (24 oz. cup) | 5 | 0.32 | 0.01 |
| Rigidity (RT) lidded filled (kg-F) (30 oz. cup) | 5 | 1.42 | 0.06 |
| Rigidity (RT) lidded filled (kg-F) (24 oz. cup) | 5 | 0.92 | 0.01 |
| Rigidity (RT) lidded unfilled (kg-F) (30 oz. cup) | 5 | 1.32 | 0.05 |
| Rigidity (RT) lidded unfilled (kg-F) (24 oz. cup) | 5 | 0.86 | 0.02 |
| Rigidity (RT) unlidded filled (kg-F) (30 oz. cup) | 5 | 0.78 | 0.02 |
| Rigidity (RT) unlidded filled (kg-F) (16 oz. cup) | 5 | 0.58 | 0.03 |
| Rigidity (RT) unlidded unfilled (kg-F) (24 oz. cup) | 5 | 0.80 | 0.01 |
| Rigidity (RT) unlidded unfilled (kg-F) (30 oz. cup) | 5 | 0.68 | 0.02 |
| Rigidity (RT) unlidded unfilled (kg-F) | 5 | 0.44 | 0.01 |
| Thermal Conductivity - 21° C. (W/m-K) | 5 | 0.0552 | 0.0003 |
| Thermal Conductivity - 93° C. (W/m-K) | 5 | 0.0640 | 0.0001 |
| Time to cool (200° F. to 140° F.) (sec) | 3 | 3600 | 0 |
| Top Load (lbf) (16 oz. cup) | 6 | 143 | 4 |
| Top Load (lbf) (24 oz. cup) | 6 | 138 | 3 |
| Top Load (lbf) (30 oz. cup) | 6 | 96 | 4 |
| Weight (g) (16 oz. cup) | 10 | 10.8 | 0.1 |
| Weight (g) (24 oz. cup) | 10 | 13.7 | 0.0 |
| Weight (g) (30 oz. cup) | 10 | 13.7 | 0.1 |

Example 5—Formulation and Extrusion

A base resin blend comprised Braskem Amppleo® 1025MA, JPP MFX6 PP Resin, and Braskem TI215OC. The base resin blend was blended with regrind and a chemical blowing agent. The chemical blowing agent was Ecocell® P. Percentages were about:

| | |
|---|---|
| 42.7% | Braskem Amppleo ® 1025MA |
| 30% | JPP MFX6 |
| 5% | Braskem TI215OC |
| 22% | Regrind |
| 0.3% | Ecocell ® P |
| 11.8 lbs/hr $CO_2$ physical blowing agent introduced into the molten resin | |

The formulation was added to an extruder hopper. The extruder heated the formulation to form a molten resin mixture. The molten mixture was extruded between the extruded insulative cellular non-aromatic polymeric material and the film, as suggested in FIG. 1.

A polymeric-lamination layer comprised reground insulative cellular-nonaromatic polymeric material and Flint Hills P9H8M-015 Polypropylene. The two resins were blended with Colortech E-1274 Blue White as the colorant. Percentages by weight were about:

| | |
|---|---|
| 47.5% | Regrind |
| 47.5% | Flint Hills P9H8M-015 Polypropylene |
| 5% | Colortech E-1274 Blue White |

The formulation was added to an extruder hopper. The extruder heated the formulation to form a molten resin mixture. The molten mixture was extruded between the extruded insulative cellular non-aromatic polymeric material and the film, as suggested in FIG. 6.

The resulting composite material had properties according to Table 4.

TABLE 4

| Multi-Layer Sheet Density (g/cm³) | | Foam Cell Count | | Foam Aspect Ratio | | Foam Closed Cell % | |
|---|---|---|---|---|---|---|---|
| X Bar | STD | X Bar | STD | X Bar | STD | X Bar | STD |
| 0.151 | 0.004 | 844012 | 132336 | 2.16 | 0.26 | 86.94 | 3.28 |

Example 6—Regrinding

An example of the regrinding process is described in the Figures. Amppleo® 1025MA from Braskem, Daploy™

WB140 HMS from Borealis, Waymax MFX6 from JPP, and regrind material were tested for melt elasticity. Briefly, the resins were extruded using an extruder having a wheel position about 114 mm below the die, ambient wheel temperature, a barrel diameter of 12 mm, a die entry angle of about 180°, a 2 mm die diameter, a 30 mm die length, with a 6 minute preheat time and a 200° C. barrel temperature. The experiments were repeated in triplicate. The results are shown in Table 5.

TABLE 5

| Material | Average Velocity at break (mm/s) | Average Load at break (N) |
| --- | --- | --- |
| Amppleo 1025MA | 131.8 | 0.54 |
| Daploy WB140 HMS | 120.8 | 0.45 |
| Waymax MFX6 | 125.7 | 0.46 |
| Regrind | 454.8 | 0.075 |

Example 7—Formulation and Extrusion

Polymeric material for forming the cup bottom was prepared as follows. A base resin blend comprised a high melt strength polypropylene, a polypropylene homopolymer, and a polypropylene elastomer. The base resin blend was blended with regrind, a chemical blowing agent, an antioxidant, and a nucleating agent. Percentages were:

| | |
| --- | --- |
| 73.9% | Borealis WB140 HMS high melt strength homopolymer polypropylene |
| 4.6% | Braskem Inspire 6025N |
| 9.2% | ExxonMobil Vistamaxx ™ 6102 elastomer |
| 0.2% | Clariant Hydrocerol ® CF-40E ™ |
| 0.8% | Heritage Plastics HT4HP Talc |
| 1.9% | Colortech 10614-31 Antioxidant |
| 10% | Bottom Stock regrind |

The formulation was added to an extruder hopper. The extruder heated the formulation to form a molten resin mixture. $CO_2$ was added to the molten resin mixture to expand the resin at a rate of 11.8 lbs/hr. The formed mixture was extruded through a die head into a strip.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment, and systems. These and other components are disclosed herein, and it is understood that when combinations, subsets, interactions, groups, etc. of these components are disclosed while specific reference of each various individual and collective combinations and permutation of these may not be explicitly disclosed, each is specifically contemplated and described herein, for all methods, equipment, and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only.

It should further be noted that any publications and brochures referred to herein are incorporated by reference in their entirety.

The invention claimed is:

1. An insulative cup comprising
a body including a sleeve-shaped side wall and
a floor coupled to the body to define an interior region bounded by the sleeve-shaped side wall and the floor, wherein the body comprises a sheet comprising insulative cellular non-aromatic polymeric material having localized plastic deformation in at least one selected region of the body to provide a plastically deformed first material segment having a first density located in a first portion of the selected region of the body and a second material segment having a second density lower than the first density located in an adjacent second portion of the selected region of the body without fracturing the insulative cellular non-aromatic polymeric material so that a predetermined insulative characteristic is maintained in the body,
wherein the cup is substantially free of an adhesive, and
wherein the side wall comprises a multi-layer sheet comprising the insulative cellular polymeric material, a film layer, an ink layer printed on the film layer, and a polymeric-lamination layer extending between and interconnecting the film layer to the insulative cellular polymeric material.

2. The insulative cup of claim 1, wherein the rigidity of an unfilled insulative cup is at least about 0.7 kg-F.

3. The insulative cup of claim 2, wherein the insulative cup has a top load of at least about 90 lbf.

4. The insulative cup of claim 3, wherein the insulative cellular non-aromatic polymeric material and the polymeric-lamination layer comprise polypropylene, regrind, or both.

5. The insulative cup of claim 4, wherein the side wall of the insulative cup has a puncture resistance of at least about 8,000 gf using a ¼ probe.

6. The insulative cup of claim 5, wherein the side wall of the insulative cup has an Elmendorf Tear in the machine direction (MD) of at least 200 gf.

7. The insulative cup of claim 4, wherein the regrind is about 0.05% to about 99.5% by weight of the polymeric-lamination layer.

8. The insulative cup of claim 7, wherein the regrind comprises ink.

9. The insulative cup of claim 1, wherein the insulative cellular non-aromatic polymeric material comprises
   about 40% to about 99.5% by weight of a base resin blend, and
   up to about 50% by weight regrind.

10. The insulative cup of claim 9, wherein the base resin blend comprises a first polypropylene homopolymer and a second polypropylene homopolymer.

11. The insulative cup of claim 10, wherein the first polypropylene homopolymer is a first high melt-strength polypropylene and the second polypropylene homopolymer is a second high melt-strength homopolymer.

12. The insulative cup of claim 11, wherein the base resin blend further comprises a high crystallinity copolymer.

13. The insulative cup of claim 12, wherein the regrind is substantially free of an adhesive.

14. The insulative cup of claim 1, wherein the rigidity of an unfilled insulative cup is at least about 0.7 kg-F and the insulative cup has a top load of at least about 90 lbf.

* * * * *